(12) United States Patent
Abdullah et al.

(10) Patent No.: US 9,854,450 B2
(45) Date of Patent: Dec. 26, 2017

(54) ENHANCED DATA COLLECTION, PROCESSING, AND ANALYSIS FACILITIES

(71) Applicant: Sybase 365, LLC., Dublin, CA (US)

(72) Inventors: Khalid Ata Atiyah Abdullah, Ashburn, VA (US); Arturo Buzzalino, Centreville, VA (US); Steven Charles Garcia, South Riding, VA (US); Vaibhav Vohra, Mountain View, CA (US); Kimmo Olavi Vuori, Espoo (FI)

(73) Assignee: Sybase 365, LLC., Dublin, CA (US)

( * ) Notice: Subject to any disclaimer, the term of this patent is extended or adjusted under 35 U.S.C. 154(b) by 40 days.

(21) Appl. No.: 14/946,350

(22) Filed: Nov. 19, 2015

(65) Prior Publication Data

US 2016/0323767 A1    Nov. 3, 2016

Related U.S. Application Data

(60) Provisional application No. 62/155,604, filed on May 1, 2015.

(51) Int. Cl.

| H04W 40/00 | (2009.01) |
|---|---|
| H04W 16/18 | (2009.01) |
| H04W 24/08 | (2009.01) |
| H04L 29/08 | (2006.01) |
| H04W 4/02 | (2009.01) |

(52) U.S. Cl.
CPC .............. *H04W 16/18* (2013.01); *H04L 67/22* (2013.01); *H04W 4/02* (2013.01); *H04W 24/08* (2013.01)

(58) Field of Classification Search
CPC ....... H04W 4/24; H04W 12/12; H04W 8/245; H04W 24/00; H04W 16/18; H04W 16/12; H04W 16/14; H04W 16/32; H04W 80/04; H04W 84/12; H04M 2215/232; H04M 1/72533; H04L 2012/5607
USPC ................ 455/405–408, 418–420, 423–425, 455/446–449; 370/310.2, 328, 338
See application file for complete search history.

(56) References Cited

U.S. PATENT DOCUMENTS

| 7,551,922 | B2* | 6/2009 | Roskowski | ........... | H04W 24/00 455/226.1 |
|---|---|---|---|---|---|
| 8,254,959 | B2* | 8/2012 | Fix | ........................ | G01S 5/0252 370/328 |
| 8,406,730 | B1* | 3/2013 | English | .................. | H04M 11/04 455/404.1 |
| 8,538,379 | B1* | 9/2013 | Stachiw | ................ | H04M 15/43 379/114.01 |
| 2006/0105795 | A1* | 5/2006 | Cermak | ................. | G06Q 10/10 455/518 |
| 2010/0015926 | A1* | 1/2010 | Luff | ..................... | H04L 41/0604 455/67.13 |

(Continued)

*Primary Examiner* — Steve D Agosta
(74) *Attorney, Agent, or Firm* — Jones Day

(57) ABSTRACT

A method and corresponding apparatus configured to collect raw data from a plurality of wireless devices. The raw data includes activity recorded when the wireless devices are at a selected topographic region. The raw data is combined to produce aggregated data representative of the activities of the individual wireless devices. Either the aggregated data or the raw data are selected for analysis depending on whether the raw data meets a threshold activity or subscriber density level. The selected data are analyzed to identify activity patterns of users of the wireless devices.

14 Claims, 21 Drawing Sheets

(56) References Cited

U.S. PATENT DOCUMENTS

| | | | |
|---|---|---|---|
| 2010/0016011 A1* | 1/2010 | Alen | G06Q 30/02 455/550.1 |
| 2010/0151816 A1* | 6/2010 | Besehanic | G06Q 30/02 455/405 |
| 2010/0203876 A1* | 8/2010 | Krishnaswamy | G06Q 30/02 455/418 |
| 2010/0262487 A1* | 10/2010 | Edwards | G06Q 30/02 705/14.43 |
| 2011/0195707 A1* | 8/2011 | Faerber | H04W 24/08 455/423 |
| 2013/0189957 A1* | 7/2013 | Kamal | H04W 8/18 455/412.1 |
| 2013/0273941 A1* | 10/2013 | Grokop | H04N 21/24 455/456.3 |

\* cited by examiner

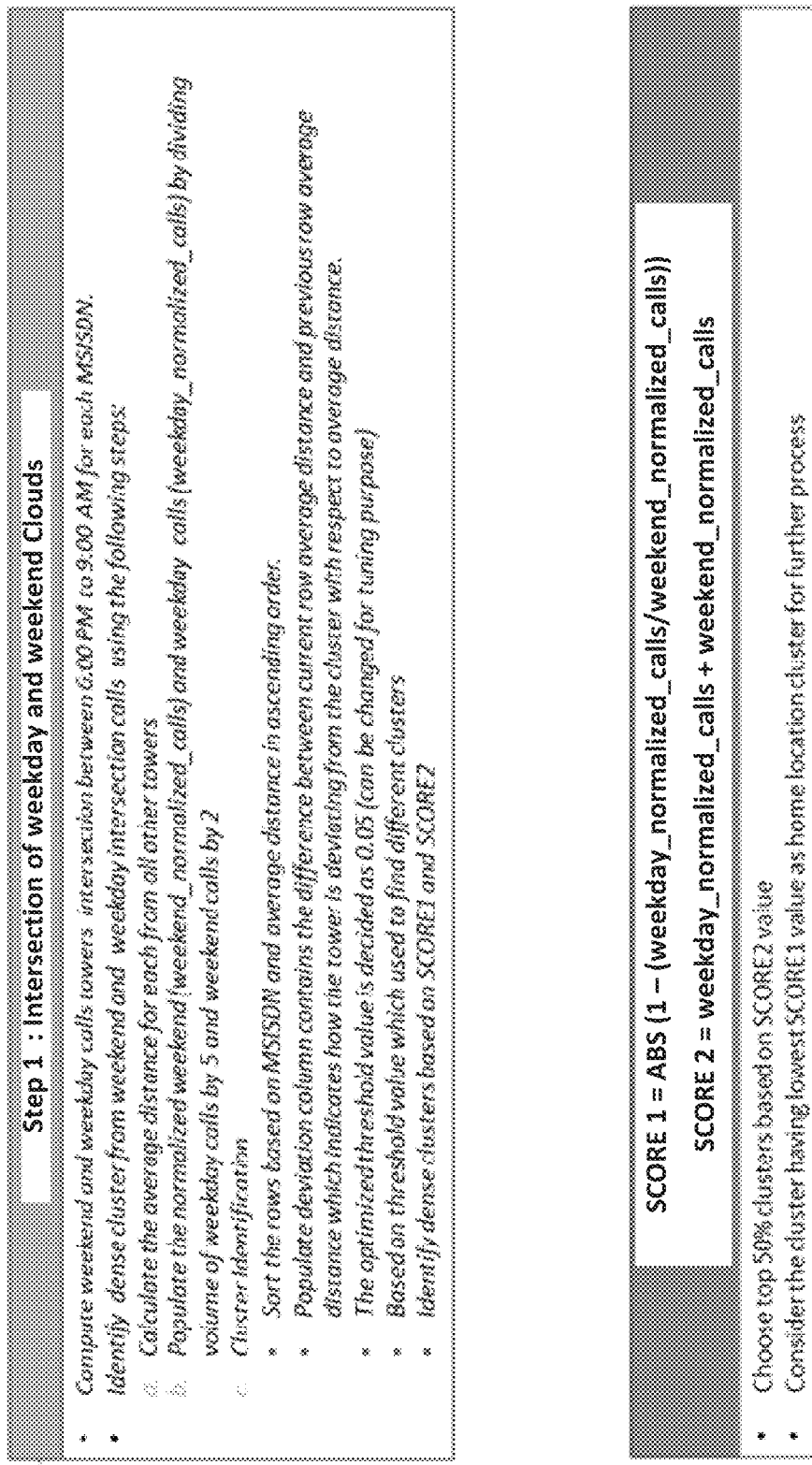
Figure 12.b

ENHANCED DATA COLLECTION, PROCESSING, AND ANALYSIS FACILITIES

RELATED APPLICATIONS

This application claims priority to U.S. Patent Application Ser. No. 62/155,604, filed on May 1, 2015, the content of which is incorporated herein in its entirety.

TECHNICAL FIELD

The present disclosure relates to data collection, processing, and analysis, and, in particular, to the collection, processing, and analysis of data from various data producers including inter alia telecommunication operators or carriers such as, among others, cellular, wireless, mobile, etc. telephone and data service providers.

BACKGROUND

There are more mobile devices in the world today than there are people. The proliferation of mobile devices has changed significantly the ways in which people communicate, live, and engage with others at work and in their personal lives. For example, the proliferation of smart devices has significantly changed the behavior of mobile-enabled consumers in connection with how they interact with, for example, companies and brands. As more and more consumers become connected around the world through mobile devices, smartphones, the Internet, etc., all of these interactions create massive quantities of data. As well, the continuing evolution of Internet of Things (IoT)/Machine-to-Machine (M2M) initiatives, with among other things the possibility of millions if not billions of additional connected devices, creates additional massive quantities of data. The sheer volume, scale, velocity, etc. of all of the data has made effective analysis difficult.

BRIEF DESCRIPTION OF THE DRAWINGS

FIGS. 12a-12c illustrate aspects of different ways in which a device user's home location may be developed in connection with the enhanced data collection, processing, and analysis techniques described herein.

DESCRIPTION OF EXAMPLE EMBODIMENTS

Overview

Figure 1:
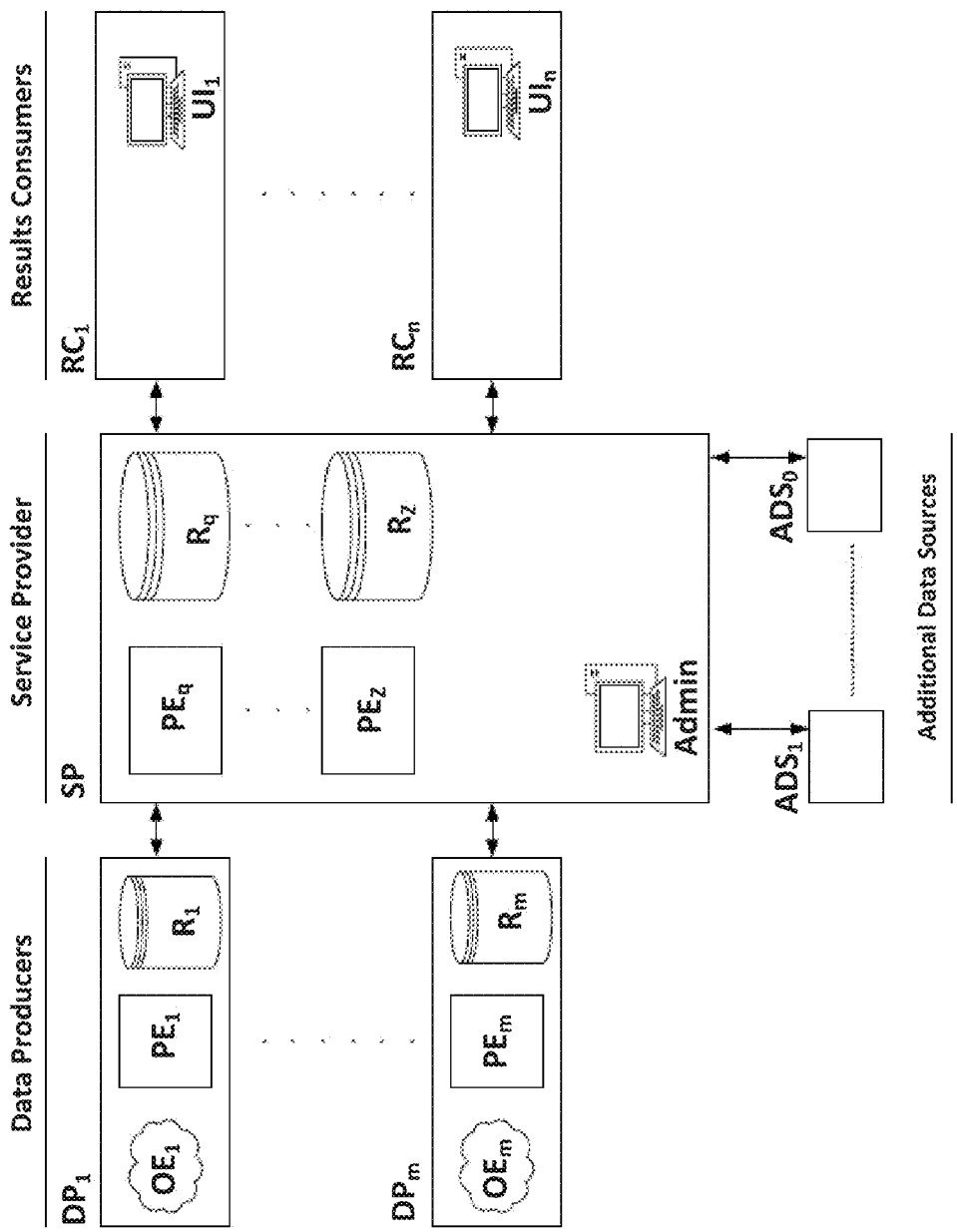
FIG. 1 illustrates aspects of an exemplary environment in which embodiments of the enhanced data collection, processing, and analysis described herein may be implemented.

For simplicity of exposition the discussion below will focus principally on telecommunications providers generally and mobile operators (e.g., Mobile Network Operators (MNOs)) specifically. It will be readily apparent to one of ordinary skill in the relevant art that numerous other contexts are easily possible including for example and inter alia transportation environments, IoT/M2M environments, (customer, etc.) support operations, public health management activities, public safety management activities, event management, financial environments, etc.

The enhanced data collection, processing, and analysis apparatus and corresponding methodologies described herein (referred to variously as "SAP Consumer Insight 365," "Consumer Insight 365," "Consumer Insight," or simply "CI") leverage numerous of a mobile operator's data sources to inter alia identify patterns, consumer demographic trends, activities, etc. providing among other things actionable market intelligence, a deeper and more accurate/insightful/etc. understanding of consumer behavior, monetization opportunities, etc. CI may obtain data from mobile operators worldwide to provide users with rich, reliable consumer behavior and insight analytics and analyses services. Results may be delivered to users through inter alia a smart portal with quick intuitive service packages utilizing among other things simple subscription models.

CI may be implemented as any combination of premise-based services and/or cloud-based services and may be powered by SAP HANA® or any other underlying database infrastructure that enables the types of storage, processing, and analysis activities described herein. Mobile operator data may be stored discreetly and individually partitioned within secure cloud data centers and CI onsite appliances. A user friendly customer access portal makes cleansed, clustered, aggregated, etc. data sets available to end users.

CI may support real time or near real time understanding and awareness within mobile data usage, trends and patterns. This provides operators, retailers, researchers, advertising/marketing companies, etc. with a comprehensive market (e.g., 'big picture') view of inter alia dynamically changing market opportunities within desired market footprints. The types of information and analysis that may be provided include inter alia:

1) Marketing and behavioral based demographic movement and mobile activities by macro/micro location and targeted advertising polling analysis;

2) Communication (Short Message Service (SMS)/Multimedia Message Service (MMS)/etc. messaging, (click stream, etc.) data, call activity, etc.) pattern analysis to identify among other things specific opportunity decision maker groups and locations;

3) Patterns over time may provide predictable trends and the ability to rank by the frequency of interaction with consumer's browsing, apps, tethering, locations trends and others;

4) Consumer's preferences and trends by locations, browsing and social patterns;

5) New user understanding by location, preferences, interests, activities implemented through user models;

6) Consumer event predictions (such as for example "about to purchase," "about to leave," "advertisement acknowledgement," etc.) and impending purchase behavior change scenarios (e.g., coupon or discount delivery, etc.);

7) Mobile marketing, advertising campaign, short code, coupon, discount, etc. effectiveness and return on investment performance;

8) Consumer roaming/movement, search, purchase, etc. activities in support of retail site selection/renewal/etc., competitor benchmarking, etc.

9) Consumer search, messaging, posting, etc. activities in support of political, sports, entertainment, etc. events;

10) Consumer search, purchase, etc. activities in support of "hole in basket" analysis (e.g., identifying, determining, quantifying, etc. how/when/why a consumer secures or completes other purchases or acquisitions);

11) Social, public health, epidemiological, etc. insight;

12) Understanding regarding mobile, etc. application search, purchase or other acquisition, installation, operation/usage, removal, etc; and/or 13) Fraud detection, mitigation, etc. initiatives.

A CI service offering thus may allow enterprises to gain insight from the processing and analysis of massive amounts of aggregated and anonymized data residing in inter alia operator networks in real time. This market intelligence may enable brands to strengthen relationships with consumers through more targeted and context-specific marketing efforts, enhanced analytics, improved (customer, etc.) support operations, etc.

The narrative that was presented above is illustrative only and it will be readily apparent to one of ordinary skill in the relevant art that numerous variations, alternatives, etc. are easily possible.

EXAMPLE EMBODIMENT

FIG. 1 depicts an exemplary environment in which aspects of CI may operate. The environment that is illustrated in FIG. 1 comprises:

Data Producers (DPs) such as $DP_1 \rightarrow DP_m$;

A Service Provider (SP); and

Results Consumers (RCs) such as such as $RC_1 \rightarrow RC_n$.

It is important to note that the particulars of FIG. 1 (such as for example the specific components that are presented, the component arrangement that is depicted, etc.) are illustrative only and it will be readily apparent to one of ordinary skill in the relevant art that numerous alternatives (including inter alia other or different components, alternative component arrangements, etc.) are easily possible.

For example and inter alia, for simplicity of exposition only one SP is depicted in FIG. 1. Multiple SPs are indeed possible—to inter alia provide for redundancy, enhanced performance (through for example the distribution of workload), etc.—and may be exposed in different fashions—e.g., individually, through a shared interface as a single logical/virtual SP, separately, etc.

Data Producers

A Data Producer (DP) is an entity that, for example during the normal course of its operations, generates (business, activity, transaction, etc.) data.

A DP may be, for example, any combination of one or more of inter alia a telecommunications provider such as a landline operator or carrier or a mobile operator or carrier, an Internet Service Provider (ISP), a credit card clearinghouse or other financial institution, a social media operation, a retail operation, etc.

Among other things a DP may comprise an Operating Environment (OE, such as $OE_1$ and $OE_m$ in FIG. 1) which possibly inter alia supports a DP's normal operations.

Within a telecommunications context a DP's OE might comprise data of various types including for example any combination of one or more of possibly inter alia:

1) Structural Data. Such as for example information on cell towers, antennas, etc. (including for example and inter alia identifiers, coverage strength/geometry/etc., capabilities, etc.), Short Message Service Centers (SMSCs), Multimedia Message Service Centers (MMSCs), Mobile Switching Centers (MSCs), gateways, network interfaces, etc.

2) Subscriber Data. Such as for example subscriber identifiers; service provisioning details; personal characteristics (if allowed) like age, gender, etc.; device information like identifiers, vendor, type, features and capabilities, Type Allocation Code (TAC), etc.; etc.

3) Activity Data. Such as for example data from signaling, roaming, registration, voice, data, Internet access and utilization information, Wireless Application Protocol (WAP), mobile application downloading/usage/etc. information, (SMS/MMS/Internet Protocol (IP) Multimedia Subsystem (IMS)/etc.) messaging, lookup, location, Wi-Fi, Near Field Communication (NFC), 3G/4G/5G/etc., Long-Term Evolution (LTE), Radio Frequency Identification (RFID), call/event/message/etc. detail record information, etc.

4) Generated Data. Such as for example billing records, etc.

Figure 3:
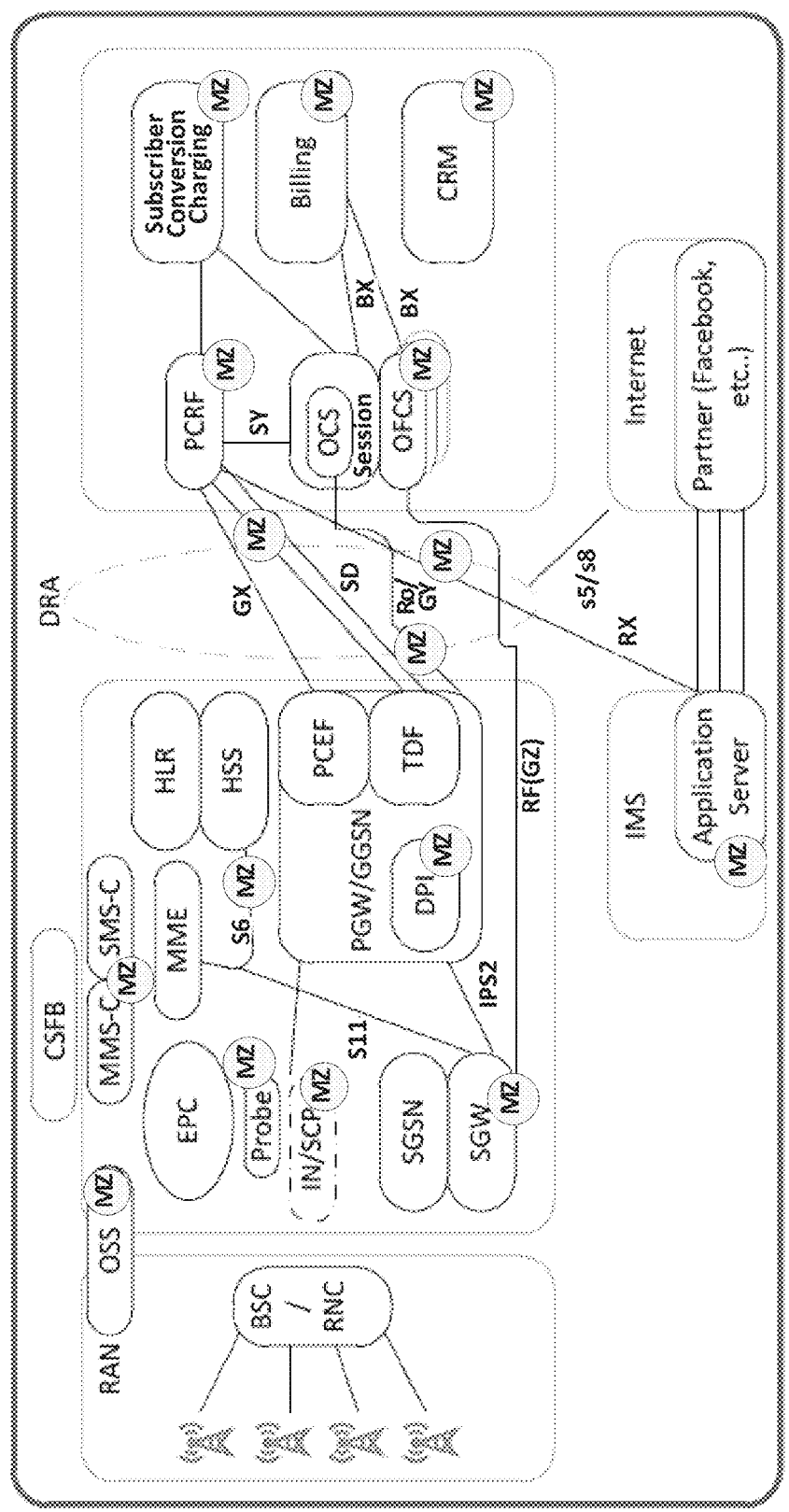
FIG. 3 depicts various network elements in an Operating Environment (OE) that are leveraged in connection with performing enhanced data collection, processing, and analysis consistent with the embodiments described herein.

As just one example, for the case where a DP is a mobile operator or carrier:

1) FIG. 3 depicts various of the network elements—Base Station Controller (BSC), Circuit-Switch Fallback (CSFB), Evolved Packet Core (EPC), Gateway GPRS Support Node (GGSN), Home Location Register (HLR), Home Subscriber Server (HSS), IP Multimedia Subsystem (IMS), Intelligent Network/Service Control Point (IN/SCP), Multimedia Exchange (MME), MMS, Online Charging System (OCS), Offline Charging System (OFCS), Policy and Charging Enforcement Function (PCEF), Policy and Charging Rules Function (PCRF), PDN Gateway (P-GW), Radio Access Network (RAN), Radio Network Controller (RNC), Serving GPRS Support Node (SGSN), Serving Gateway (S-GW), SMS, and Traffic Detection Function (TDF), etc.—that are typically found within the OE of a mobile operator or carrier.

Figure 4:
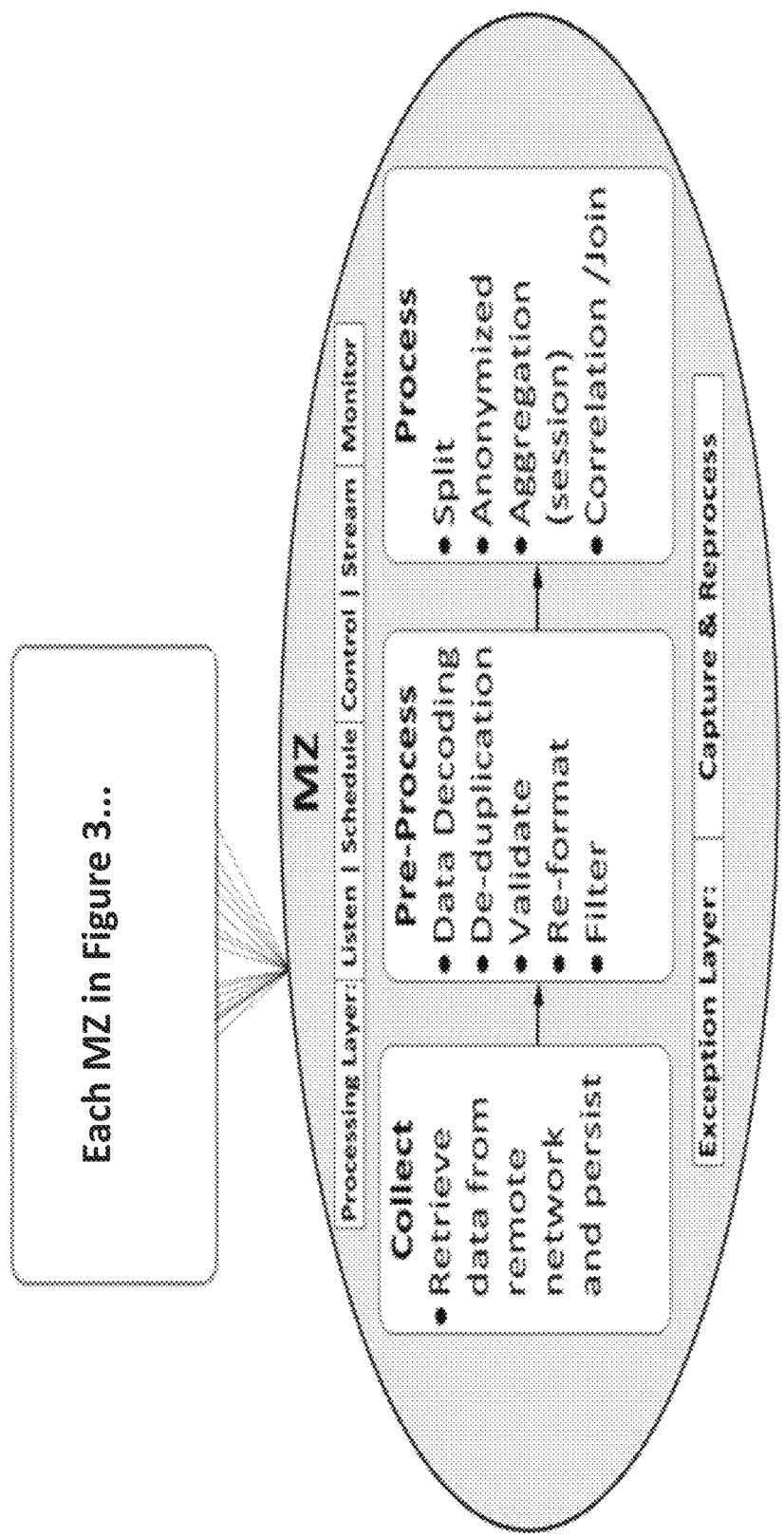
FIG. 4 extends a hypothetical OE depicted in FIG. 3 to highlight possible Mediation Zones (MZs) within which aspects of a Processing Environment (PE) may reside.

2) FIG. 4 extends the hypothetical OE that was presented in FIG. 3 to (a) highlight possible Mediation Zones (MZs) within which aspects of a PE may reside and (b) identify various of the activities that may take place within a PE.

Figure 5A:
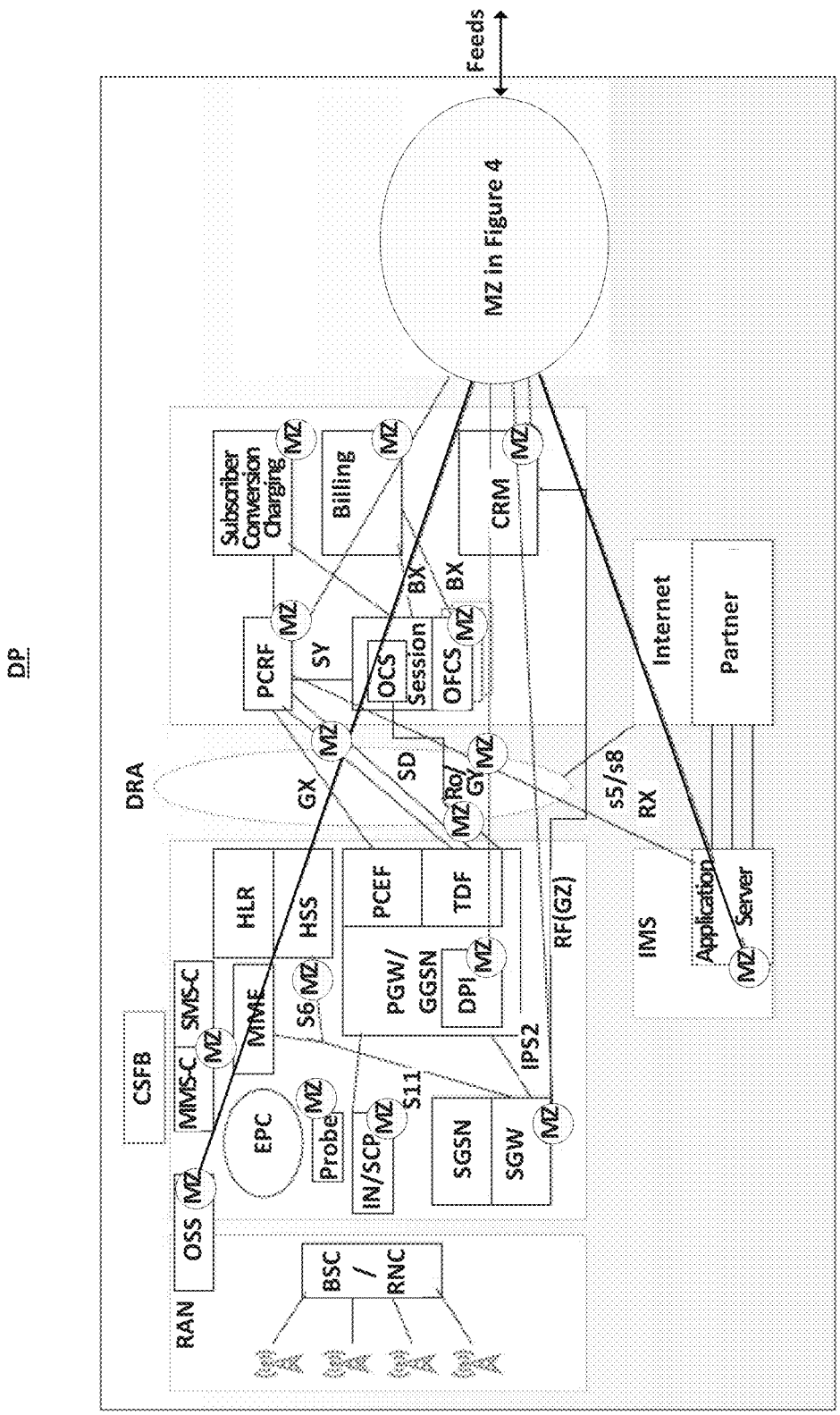
FIGS. 5a and 5b depict aspects of a hypothetical Data Producer (DP) and aspects of a hypothetical Service Provider (SP).
Figure 5B:
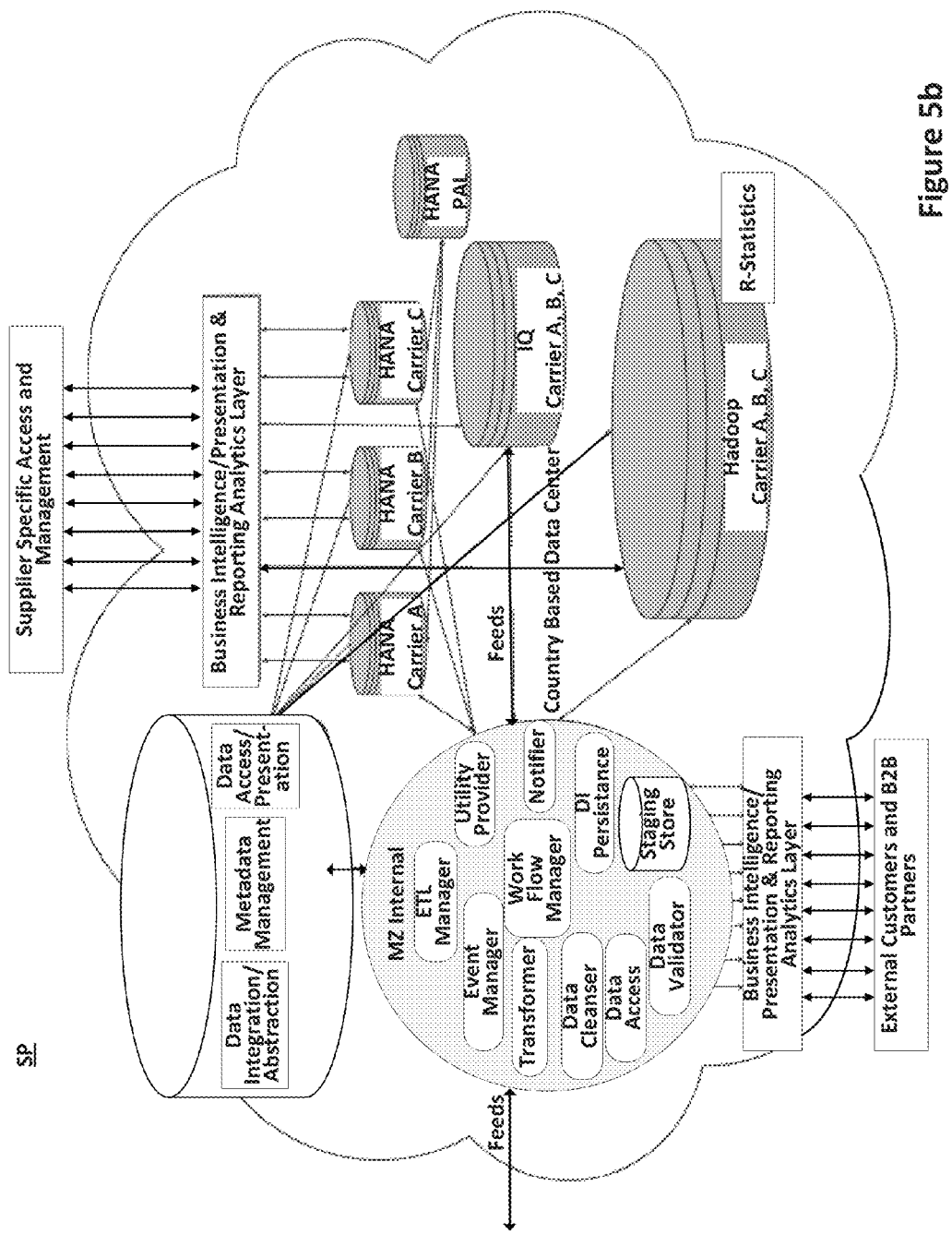

3) FIGS. 5a and 5b depict aspects of a hypothetical DP, aspects of a hypothetical SP, and one possible relationship between same.

A DP may comprise inter alia one or more Processing Environments (PE, such as for example $PE_1 \rightarrow PE_m$ in FIG. 1), each of which may comprise inter alia various processing elements such as for example computer platforms, application software, connectivity, etc., and one or more repositories (R, such as for example $R_1 \rightarrow R_m$ in FIG. 1), each of which may comprise inter alia various storage elements such as for example databases, files, etc.

Among other things a PE may pull, extract, receive, etc. data from different components, elements, systems, etc. of a DP's OE, along with possibly data from other sources internal to a DP and/or external to a DP, and then inter alia process that data.

A PE may support inter alia:

1) A management or administration facility through which inter alia operations may be controlled, scheduled, monitored, etc. Such a facility may comprise one or more of (e.g., web-based) user interfaces, Application Programming Interfaces (APIs), management frameworks (such as for example Tivoli), etc.

2) Various data extraction, collection, manipulation, pre-processing, processing, error reporting and correction, etc. operations including possibly inter alia:

a) Cleansing, smoothing, editing, etc. to for example and inter alia remove spurious data (e.g., noise, etc.), address threshold-based actions (such as for example pass/drop), etc.

b) Anonymization to for example and inter alia provide privacy protections by among other things replacing identification values (such as for example telephone number, etc.) with opaque (e.g., possibly system-generated) values;

c) Aggregation to for example and inter alia provide further privacy protections (by for example selectively combining or clustering individual, user, subscriber, etc. data);

d) Formatting to for example and inter alia (i) account for the disparate formats, structures, etc. of source systems, components, etc. and (ii) account for the format, structure, etc. of how data will be conveyed to an SP;

along with, possibly among other things, edit and validation operations, encoding and/or decoding operations, data alteration or replacement or substation activities, de-duplication activities, filtering, etc. with aspects of the above activities possibly managed by, controlled by, scheduled within, etc. a workflow facility incorporating inter alia flexible, extensible, and dynamically configurable rules, definitional artifacts, logic, etc.

3) Interacting with an SP. Such interactions may employ any combination of one or more mechanisms including possibly inter alia an API, an Electronic Data Interchange (EDI) facility, (open, secured, etc.) File Transfer Protocol (FTP), File eXchange Protocol (FXP), one or more proprietary or standards-based application-level and/or transport-level protocols, a publish-subscribe paradigm, a push-pull model, file exchanges, a (courier, overnight, etc.) delivery service, postal mail, etc. and may utilize among other things Extensible Markup Language (XML) documents, Comma-Separated Values (CSV) files, name-value pairs, etc.

Such mechanisms may comprise one or more servers, gateways, interfaces, etc. and may leverage inter alia any combination of a dedicated communication circuit, the open Internet, a Virtual Private Network (VPN), etc. and may include various security mechanisms (such as access credentials, etc.).

Such interactions may comprise various messages, including inter alia any combination of one or more of a request message, a response message, a status or inquiry message, a confirmation message, etc. Such messages may be generated on a scheduled basis, on an ad hoc (e.g., as needed) basis, etc.

The activities of enumerated Item 2 above may be controlled, managed, driven, etc. by a suite of flexible, extensible, and dynamically configurable rules. Rules may exist for inter alia (local, regional, national, global, etc.) privacy requirements; each data source system, component, etc.; data manipulation, alteration, formatting, etc. operations (e.g., 'if occurs within a X second window combine individual events to create a single event," etc.); etc.

The activities of enumerated Item 2b above—anonymization—may comprise for example any combination of one or more of static mechanisms (e.g., leveraging one or more lookup/etc. lists, etc.), dynamic mechanisms (e.g., incorporating one or more mapping/etc. algorithms such as inter alia Advanced Encryption Standard (AES), Data Encryption Standard (DES, cryptographic hash functions, one-way functions, etc.), random mechanisms, etc.; may be dynamically configurable; may be rule based (e.g., 'if less than X instances/occurrences within a defined time period then don't include' so re-identification is precluded); may incorporate one or more security/access/etc. features; may employ one or more access, control, cryptographic, etc. values (such as keys, etc.); and may inter alia address global and/or geography-specific legal, regulatory, etc. frameworks.

The activities of enumerated Item 2b above—anonymization—may operate on any combination of one or more identifiers such as for example and inter alia DP subscriber identifier, Mobile Station International Subscriber Directory Number (MSISDN), Mobile Directory Number (MDN), International Mobile Subscriber Identity (IMSI), Mobile Identification Number (MIN), Integrated Circuit Card Identifier (ICCID), International Mobile Station Equipment Identity (IMEI), Mobile Equipment Identifier (MEID), etc.

The activities of enumerated Item 2 above may leverage any number of optimization strategies to for example improve processing efficiency, reduce memory consumption, etc.

A PE may comprise inter alia any combination of one or more of local or on-premise resources, cloud-based resources, etc.

The PE repositories that were referenced above may comprise any combination of one or more of a Relational Database Management System (RDBMS), an Object Database Management System (ODBMS), an in-memory Database Management System (DBMS), specialized facilities such as SAP HANA or Sybase IQ, a data storage and management facility (such as inter alia Hadoop), different storage paradigms (such as inter alia federation), etc.

Such repositories may support one or more (logical, physical, etc.) data models. See for example FIGS. 2 and 8.

Data may be collected by the various MNO MZs and sent to the CI system, e.g., in periodic batches or on demand. This data may concern MNO particulars, subscriber details, user devices, cells, network events or blacklists.

A subscriber may be an individual that purchased mobile services from an MNO. Subscriber information may include the subscriber's age or age band, gender, home location, etc. or information concerning the subscriber's contract with the MNO.

User devices may include cell phones, smart phones, tablets and other equipment that hold data about an individual user, e.g., a subscriber. Users may be identified by an anonymized version of for example their telephone number.

A cell may be an individual transmitter or a base station, which connects a device to an MNO's network. Cell information may include information about a cell location and its coverage.

Network events may include detailed records of a single communication of data between a device and a cell at a specific point in time. Each voice call, SMS/MMS message, web/data activity, or other data generating activity such as a detected movement of the device may include multiple associated network events. Network events may be classified as one of four types: voice events, message events, data events and location events.

Blacklists may include lists of IP addresses, website domain names and/or web resources which are blacklisted by an MNO, and therefore excluded from analysis by the Consumer Insight system.

Figure 2:
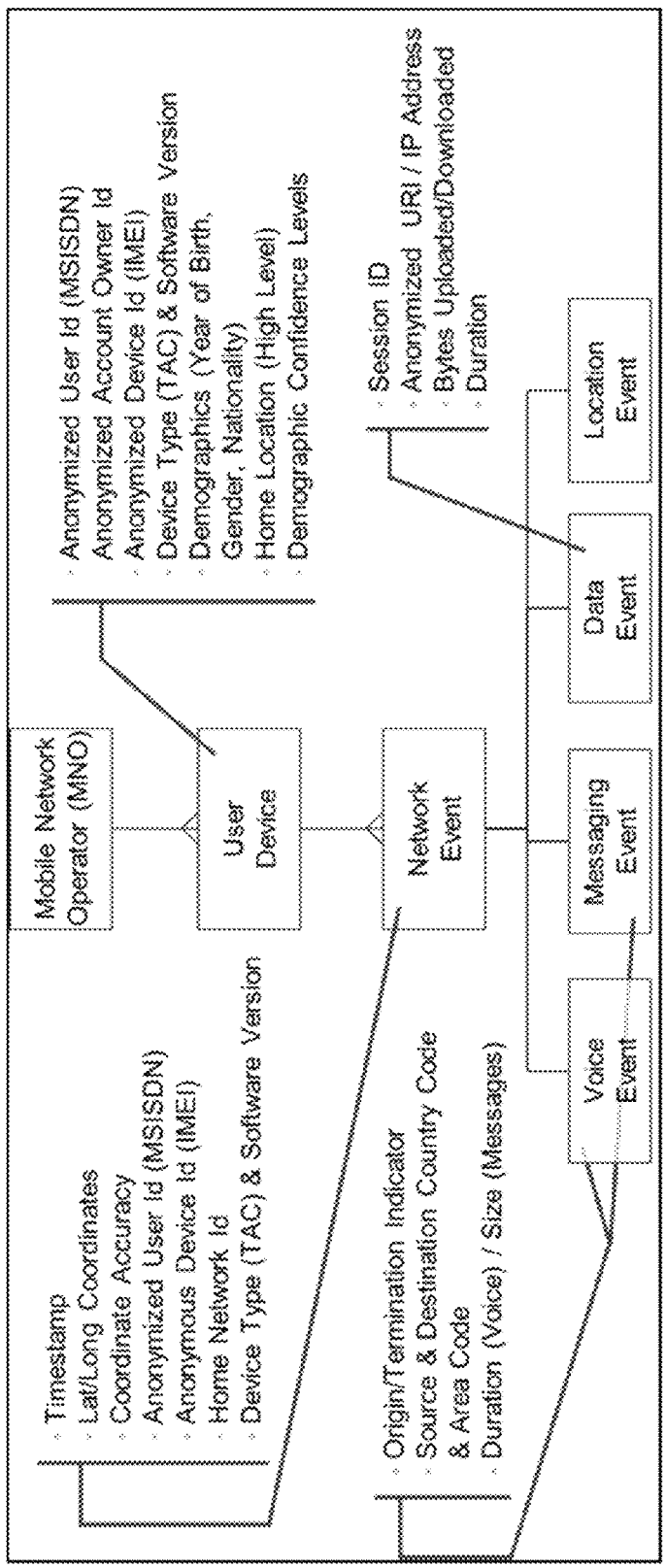
FIG. 2 illustrates some of the data attributes that may be possible within/throughout aspects of the enhanced data collection, processing, and analysis techniques described herein.

Among other things FIG. 2 depicts aspects of one possible event based approach in which information regarding various Network Events including, for example, Voice Events, Messaging Events, Data Events and Location Events, are captured. Network Event information may include, inter alia, a timestamp, latitude/longitude coordinates, an indication of coordinate accuracy, an anonymized User ID such as a Mobile Station International Subscriber Directory Number (MSISDN), an anonymized Device ID such as an International Mobile Station Equipment Identity (IMEI), a home network ID, a device type such as a Type Allocation Code (TAC) and a software version.

Voice Event and Messaging Event information may include, inter alia, an origin/termination indicator, a source/destination country code or source/destination area code, a voice call duration and a size of text or other mobile device messages, etc. Data event information may include, inter alia, a session ID, an anonymized Uniform Resource Identifier (URI) or IP address, a number of bytes uploaded/downloaded, and a data event duration, etc.

In addition to Network Event information, FIG. 2 depicts the capture and transmission of User Device information including, for example, an anonymized User ID (e.g., an MSISDN), an anonymized account owner ID, an anonymized device ID (e.g., an IMEI), a device type (e.g., TAC), a software version, user demographics (e.g., year of birth, gender, nationality, etc.), a home location (e.g., at a high level that does not identify the exact home location of the user) and demographic confidence levels.

Figure 8:
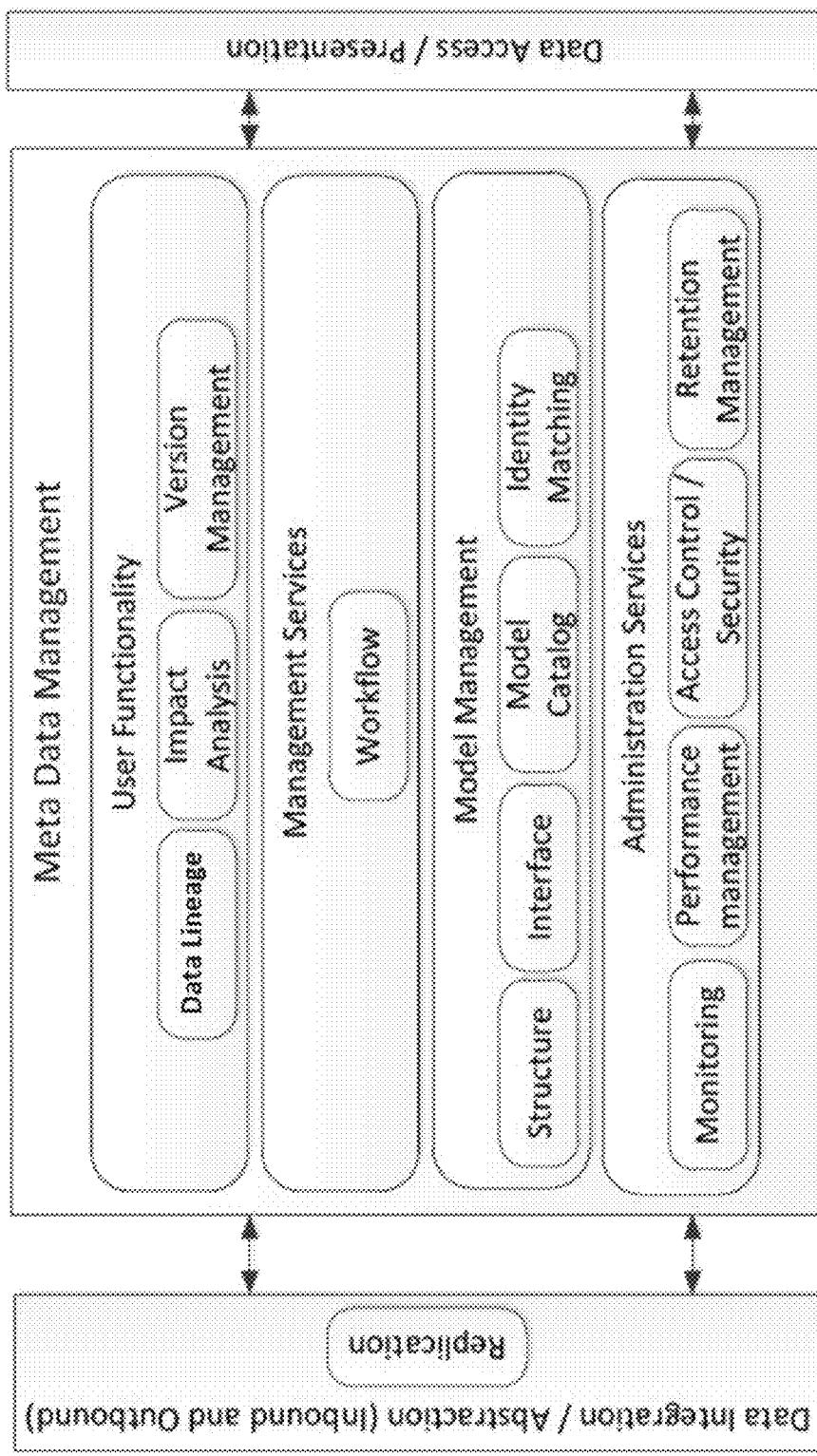
FIG. 8 illustrates aspects of one possible data, etc. model that may be used in connection with the enhanced data collection, processing, and analysis techniques described herein.

Among other things FIG. 8 depicts aspects of one possible meta data management approach. The model includes the following components: User Functionality (e.g., data lineage and impact analysis capabilities), Management Services (e.g., workflow), Model Management (e.g., a model catalog and identity matching), Administrative Services (e.g., monitoring and access control/security), Data Integration/Abstraction (e.g., replication), and Data Access/Presentation.

It is important to note that the particulars of the models (such as for example the specific data model and data model elements that are presented in FIGS. 2 and 8, the arrangements that are depicted, etc.) are illustrative only and it will be readily apparent to one of ordinary skill in the relevant art that numerous alternatives (including inter alia other or different data models and/or data model elements, alternative arrangements, etc.) are easily possible.

Service Provider

A Service Provider (SP) is an entity that inter alia (1) receives, collects, etc. data from one or more DPs, (2) performs a range of pre-processing and/or processing operations, and (3) supports the reporting, analysis, etc. needs of one or more RCs.

An SP may, for example, be realized as an independent service bureau, an element of or within some organization (such as possibly inter alia a financial institution, a retail establishment, an on-line retailer, a corporate entity, etc.), multiple entities (such as for example those just listed) or aspects of same working together, etc. It will be readily apparent to one of ordinary skill in the relevant art that numerous other arrangements are easily possible.

An SP may comprise inter alia one or more Processing Environments (PE, such as for example $PE_q \rightarrow PE_z$ in FIG. 1), each of which may comprise inter alia various processing elements such as for example computer platforms, application software, connectivity, etc., and one or more repositories (R, such as for example $R_q \rightarrow R_z$ in FIG. 1), each of which may comprise inter alia various storage elements such as for example databases, files, etc.

A processing element may comprise inter alia computer platforms, application software, connectivity, etc., along with optional associated files/stores/etc., that support among other things a range of processing activities including among other things the examination, parsing, augmentation, manipulation, replacement, checking, editing, validation, mapping, aggregation, enhancement, etc. of one or more elements of received data with the optional preservation of aspects of the results, outcome, etc. of various of the activities in for example one or more repositories.

During various of the processing activities that were described above, one or more insights, predictions, assessments, rankings, aggregations, etc. may be developed, refined, augmented, etc. including for example and inter alia subscriber particulars (e.g., gender, age, home location, shopping habits, work habits, preferences, etc.), brand particulars (e.g., rankings, conversion percentages between artifacts such as Uniform Resource Identifiers (URIs) like a Uniform Resource Locator (URL)), etc. For example and inter alia:

1) Catchment. For example, a summary of consumers that are present at one or more locations (e.g., an Area of Interest (AOI), a Point of Interest (POI), a street, a neighborhood, a town or city, a custom/arbitrary/etc. geographic region, etc.) within one or more time periods and, inter alia, an indication of where those consumers came from (e.g., an immediately-prior location, a home or origination location, etc.). Calculations, determinations, etc. may include inter alia a configurable 'dwell time' (e.g., length of stay) value.

2) Footfall. For example, foot traffic to, around, etc. one or more locations (e.g., a particular AOI, POI, etc. such as inter alia a shopping center, sport venue, city or town, airport, historic location, a custom/arbitrary/etc. geographic region, etc.) within one or more time periods identifying particulars such as for example customer type, arrival time, departure time, dwell time, activity while present (e.g., voice calls, messaging, data usage, browsing, etc.), etc. Customer type may encompass for example any combination of one or more of domain (e.g., Facebook, etc.), gender, age, socio-demographic factors, income, household size, etc. with optional clustering around any one or more of inter alia dwell time, input rate (the rate at which a particular customer type entered), output rate (the rate at which a particular customer type departed), etc.

3) Brand Value Index (BVI). For example, a measure of an entity's (e.g., company, etc.) standing ('footprint') within its respective market, operating sphere, etc. across one or more time periods based on various factors such as for example consumer sentiment (for an entity's product(s), etc.).

4) Clickstream. For example, an analysis of a device user's clickstream activity. Such an analysis may comprise one or more sessions (representing periods of time during which a device user was accessing the Internet). A session may comprise, possibly among other things, one or more chains, with each chain having a discrete beginning, capturing all of the user 'click' activity (sites visited, history, progression, etc.), and having a discrete end. As just one example, for a device user who accessed Facebook.com, then browsed over to CNN.com, but later visited ESPN.com two chains might be generated:

A) Facebook.com←→CNN.com, and

B) ESPN.COM←→

Such an analysis may include for example any combination of one or more of conversion rates between visited websites, filtering (by for example website categories, visitor age, visitor dwell time, etc.), website associations (to for example socio-demographic information, etc.), a list of the most frequently visited websites, etc. Conversion rate may be measured as a percentage or proportion of visits to a website that involve some visitor activity in response to prompting by a marketer entity, e.g., clicking on a banner advertisement.

5) Cohorts. For example, the creation and evolution of groups of consumers based on for example a shared characteristic (e.g., supporters of a sports team, place of work, hobby, political orientation, etc.).

It is important to note that the insights that were presented above are illustrative only and it will be readily apparent to one of ordinary skill in the relevant art that numerous variations, alternatives, etc. are easily possible.

Figure 10:
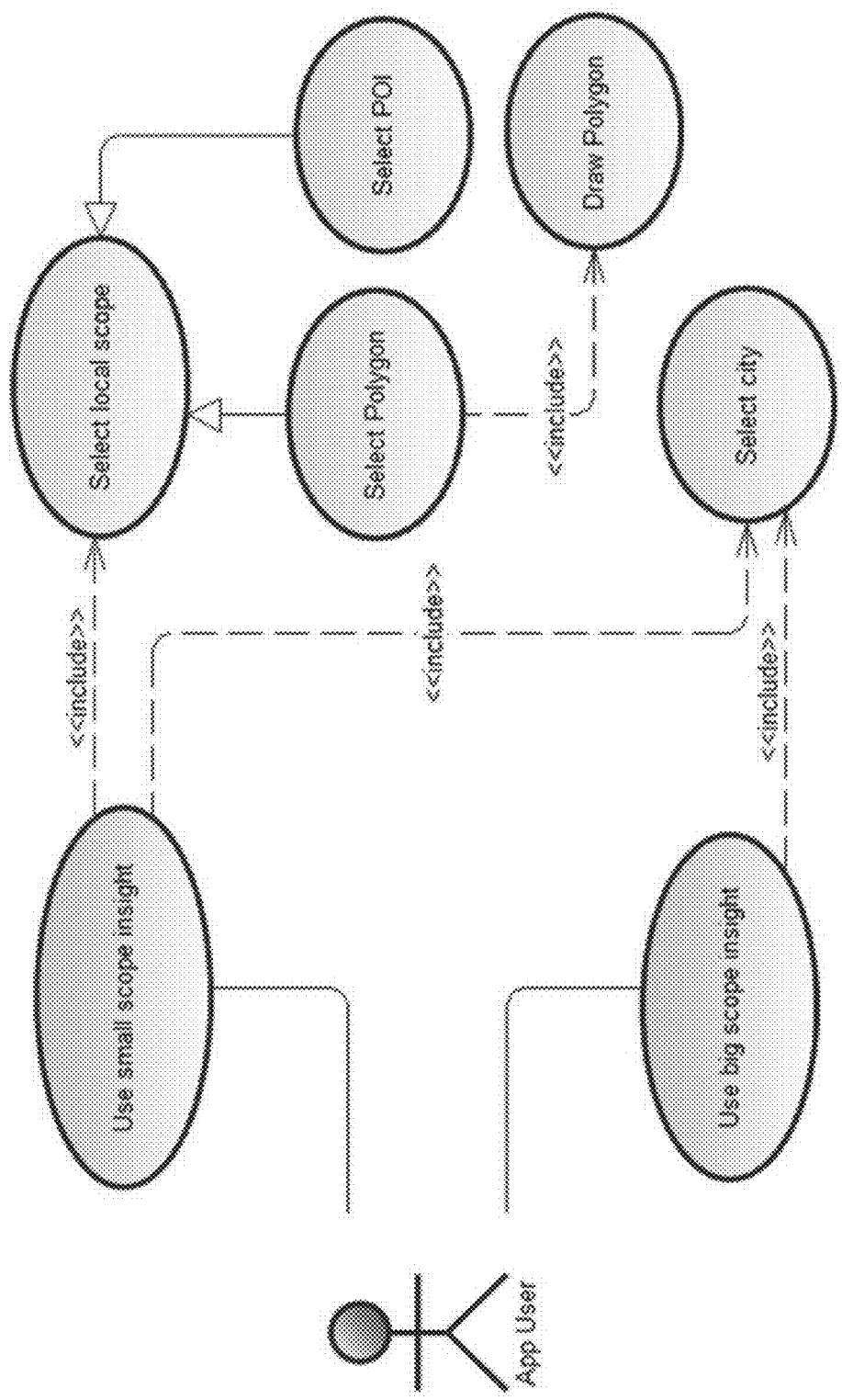
FIG. 10 depicts aspects of an exemplary insight scope classification that may be used in connection with the enhanced data collection, processing, and analysis techniques described herein.
Figure 11:
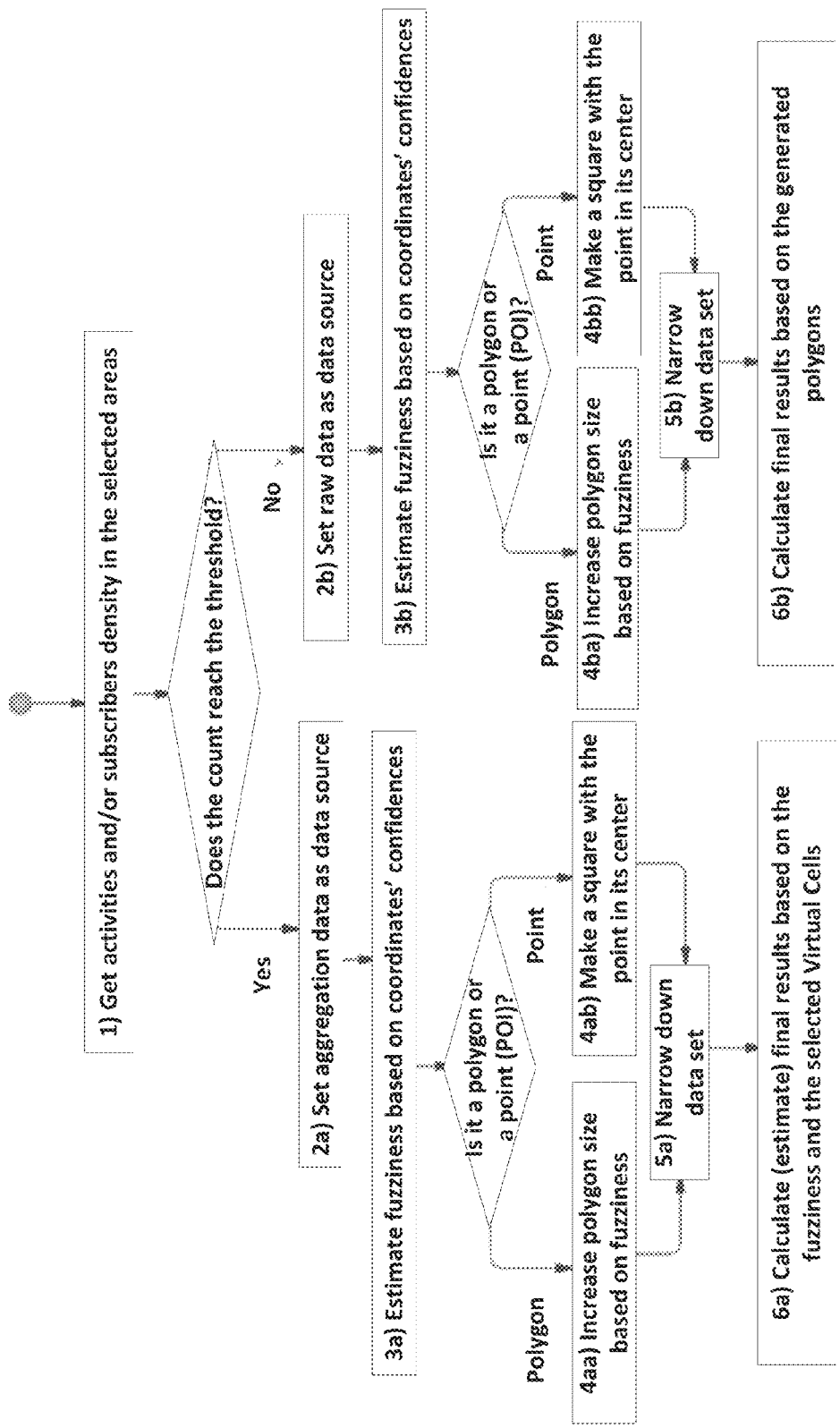
FIG. 11 illustrates aspects of exemplary small scope functionalities that may be used in connection with the enhanced data collection, processing, and analysis techniques described herein.

Aspects of the above may be categorized or classified in any number of ways. As just one example, various of the insights that were described above might be classified by their scope (see for example FIG. 10):

1) Small Scope. Examples may include, for example and inter alia, cohort, catchment, footfall, etc. FIG. 11 illustrates one example of aspects of various small scope functionalities.

2) Large Scope. Examples may include, for example and inter alia, clickstream, BVI, etc.

Aspects of the above may include (e.g., develop counts, totals, etc. for) one or more topographic regions (e.g., square, rectangle, circle, triangle, polygon, irregular shape, etc.). Thus, insights may be generated based on size of scope (e.g., displaying large scope insights in conjunction with a map of a selected city), with possible further refinements (e.g., displaying local scope insights for a selected topographic region, which may include one or more selected POIs).

FIG. 11 is a flowchart including example steps taken in connection with small scope functionalities. The steps may be performed at a user device and/or an external computer such as at a DP or an SP. At step 1, information describing activities and/or subscriber density in selected areas is obtained. A determination is made whether a count of the obtained information has reached a threshold (e.g., a threshold activity level or threshold subscriber density). If the count reached the threshold, then aggregation data is set as a data source (2a). If the count is not reached, then raw data (e.g., data of individual mobile devices) is set as the data source (2b).

After setting the data source, fuzziness is estimated based on the confidence values of coordinates (3a, 3b), e.g., a degree of confidence in the accuracy of obtained coordinates of a physical cell or virtual cell representing the selected areas. A determination is made whether the area in question is a polygon (e.g., a virtual cell) or a point (e.g., a POI). If the area is a polygon, then the polygon's size is adjusted based on the estimated fuzziness, e.g., increasing the size to reflect a lower degree of coordinate confidence (4aa, 4ba). If the area is a point, then the area is defined by making a square with the point as its center (4ab, 4bb).

After defining the area as a polygon or a square, the data set is narrowed down, e.g., by removing data not relevant to the particular analysis to be performed (5a, 5b). Final results (e.g., of an insight analysis on the defined area) are calculated based on the estimated fuzziness and the selected virtual cells (6a) or, in the case where the threshold count has not been reached, based on the generated polygons (6b).

Figure 14:
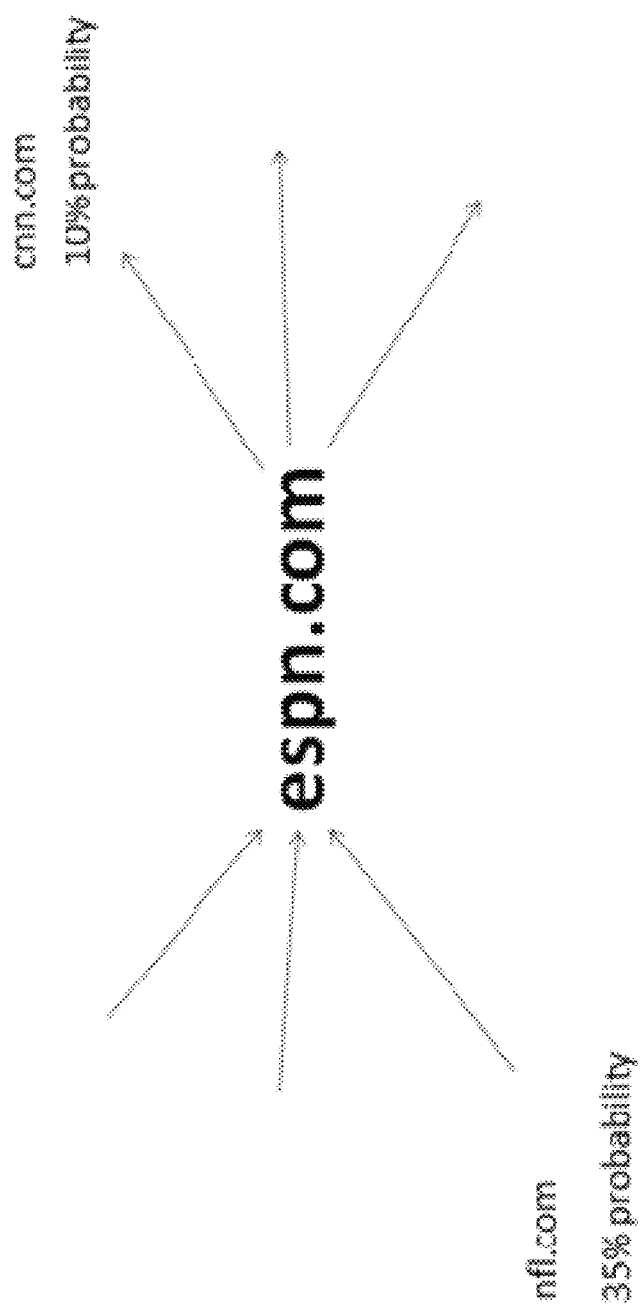
FIG. 14 illustrates aspects of an exemplary digital journey as may be developed in connection with the enhanced data collection, processing, and analysis techniques described herein.

Aspects of the above may be utilized to develop insight into a device user's digital journey (in support of among other things subsequent display, presentation, etc. such as in for example FIG. 14) involving various processing steps (such as for example the removal of 'noise' (e.g., patterns in the data arising from inter alia JavaScript, CSS, etc. which are determined to be not helpful in any future analysis), the identification of individual or discrete sessions, the aggregation of data by such things as time, etc.) and with inter alia various measures associated with each step along a journey or path. Additionally, various probabilities, percentages, etc. may be developed (such as for example "a device user at site X has a Y % likelihood of transitioning to site Z") that may be applied to inter alia predict device user behavior, activity, etc. (in connection with among other things targeted advertising, context-specific marketing efforts, etc.). FIG. 14 shows a potential journey in which the sites NFL.COM, ESPN.COM and CNN.COM are connected, with a percentage probability of going from one site to its connected site shown (e.g., 35% chance that a visitor to NFL.COM will visit ESPN.COM). The above mentioned probabilities, percentages, etc. may also be developed to describe physical movements, e.g., as shown in FIG. 14. The percentages/probabilities may be displayed in other forms besides being overlaid on a network graph (e.g., as shown in FIG. 14). For example, they may be shown as inter alia a pie chart, a bar graph, a cone chart, etc.

Aspects of the above may be utilized to develop insight into a device user's physical journey (in support of among other things subsequent display/presentation, analysis of things like 'where is a consumer coming from and where are they going to,' etc.) involving or including inter alia:

1) One or more parent (mother/father) locations, nodes, etc.,

2) One or more child locations, nodes, etc., and

3) Various of the transitions between parent and child locations, nodes, etc. (e.g., before-after patterns, etc.)

with among other things different values (such as for example date, time, frequency, etc.) captured for various of the above; different indicators (such as for example Dwell (a device user has been in a given location longer than some defined period of time), Passing By, Commuting, etc.) being developed; various artifacts (such as for example Dwell Calculation Areas (DCAs, a defined area within which dwell may be calculated) being developed; and various of the locations, nodes, etc. possibly representing such things as AOIs, POIs, etc.

Aspects of the above may incorporate inter alia information on one or more physical cells and/or virtual cells. A virtual cell may be derived, mapped, generated, calculated, etc. from inter alia one or more aspects of a DP's environment (e.g., physical cells, antenna locations, etc.), an actual geography, etc. using any number of algorithms, formulas, manipulations, etc. and targeting any level of size/precision (e.g., 1 km, 10 km, 100 km, etc.) and desired topography (e.g., square, rectangle, circle, triangle, polygon, irregular shape, etc.). Virtual cells may represent physical locations contained therein, e.g., POIs, streets, neighborhood, towns, and other geographic locations of interest.

The definition, management, etc. of virtual cells may be carried out by any combination of one or more of an SP administrator, representative(s) of a DP, etc.

Among other things any number of virtual cell definitions may be maintained for a DP, for an RC, etc. and inter alia each set of virtual cell definitions may be overlayed atop an underlying data source to for example provide different views, perspectives, scales, etc.

Figure 12A:
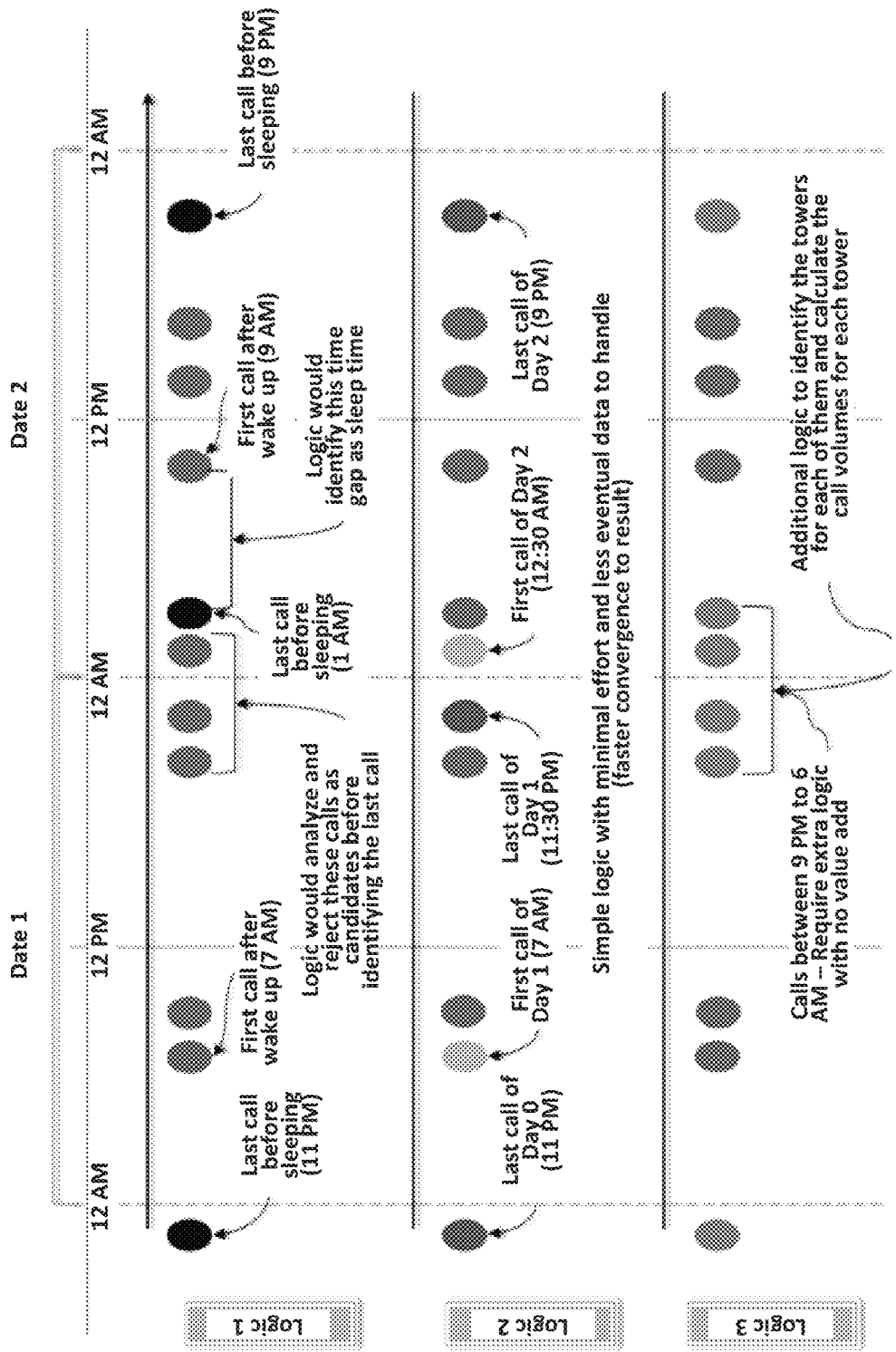
Figure 12C:
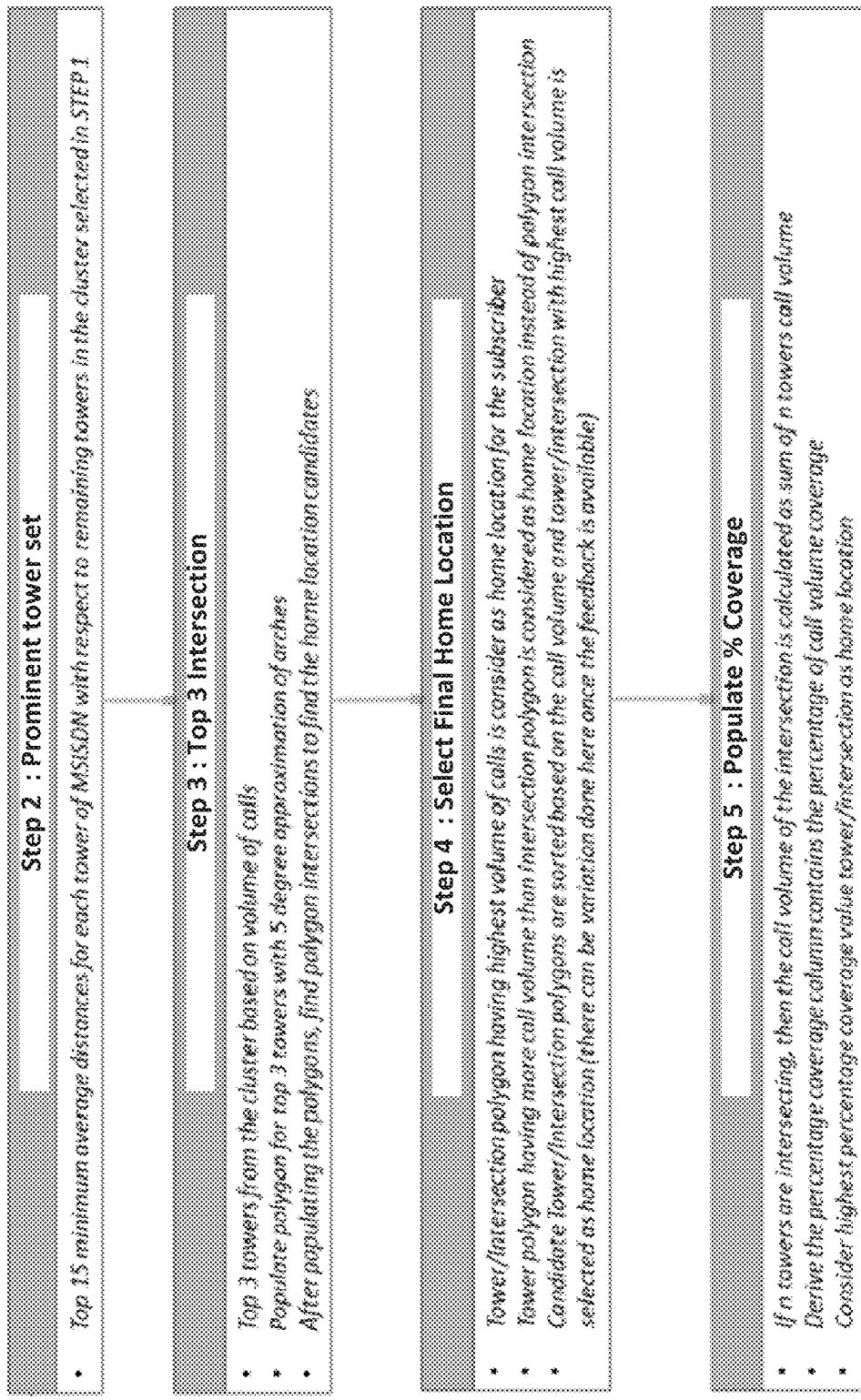

Various of the above may incorporate information on a device user's home location. As depicted in FIGS. 12a-12c, different approaches may be employed in determining, generating, etc. information on a device user's home location. For example, information on a device user's weekday and weekend patterns, habits, etc. may be leveraged to identify a home location. Such home locations may be optionally refined, processed, reviewed, preserved, subsequently reported on or included in report/analytics/etc. processing, etc.

FIG. 12a illustrates various logical approaches to identifying a home location based on call activity. Logic can be configured to analyze call activity to detect, for example, the first call of the day, the last call of the day, to disqualify calls in the afternoon as being candidates for the last call of the day, to omit analysis of calls between certain time periods, and to repeat the above analysis for various dates. More complex logic may analyze call activity with respect to sleeping patterns (e.g., detecting the last call before sleeping or the first call after wake up). The home location may be identified based on where these first and last calls occur, e.g., based on the locations of cell towers associated with the calls.

FIGS. 12b and 12c illustrate various steps for identifying a home location based on call volume for various cell towers. In step 1, intersecting towers are identified for a particular time period (e.g., between 6 PM to 9 AM) and for each mobile device (e.g., MSISDN). For each intersecting tower, the average distance for each MSISDN from all other towers is calculated. Additionally, the volumes of weekday and weekend calls are normalized by a weighting factor (e.g., 5 for weekday calls and 2 for weekend calls). Scores may be calculated as a function of normalized weekday and weekend call volume (e.g., the absolute value of one minus the ratio of the normalized volumes (Score 1) and the sum of the normalized volumes (Score 2)). Tower clusters may be identified by row-sorting a table whose column entries contain MSISDNs and respective average distances, by MSISDN and by average distance. Towers associated with adjacent rows may be identified as belonging to the same cluster when the deviation in average distance between the adjacent rows is below a specified threshold. After identifying the clusters, the densest clusters may be identified based on score, e.g., choosing the top 50% clusters with highest Score2 value as home location cluster candidates, then selecting the candidate with the lowest Score1 value as a home location cluster.

FIG. 12c illustrates further processing steps 2 to 5, taken after a home location cluster is selected in step 1. In step 2, the home location cluster is refined by selecting, as the most prominent towers, those towers whose device MSISDNs have the lowest average distance to the remaining towers in the home location cluster, e.g., selecting the top fifteen such towers.

In step 3, the home location cluster is further refined, e.g., down to three towers, by selecting those towers having the highest call volume. The coverage of each of the three towers is then approximated using, for example, a polygon for each tower. The intersections of the polygons will correspond to home location candidates.

In step 4, the tower polygon or polygon intersection having the highest call volume for a particular subscriber is selected as the home location.

Highest call volume may correspond to highest percentage coverage. For example, in step 5, the call volumes of all towers in a particular intersection are summed to derive the percentage coverage for the intersection. The tower or intersection with the highest percentage coverage may then be considered the home location.

Figure 13:
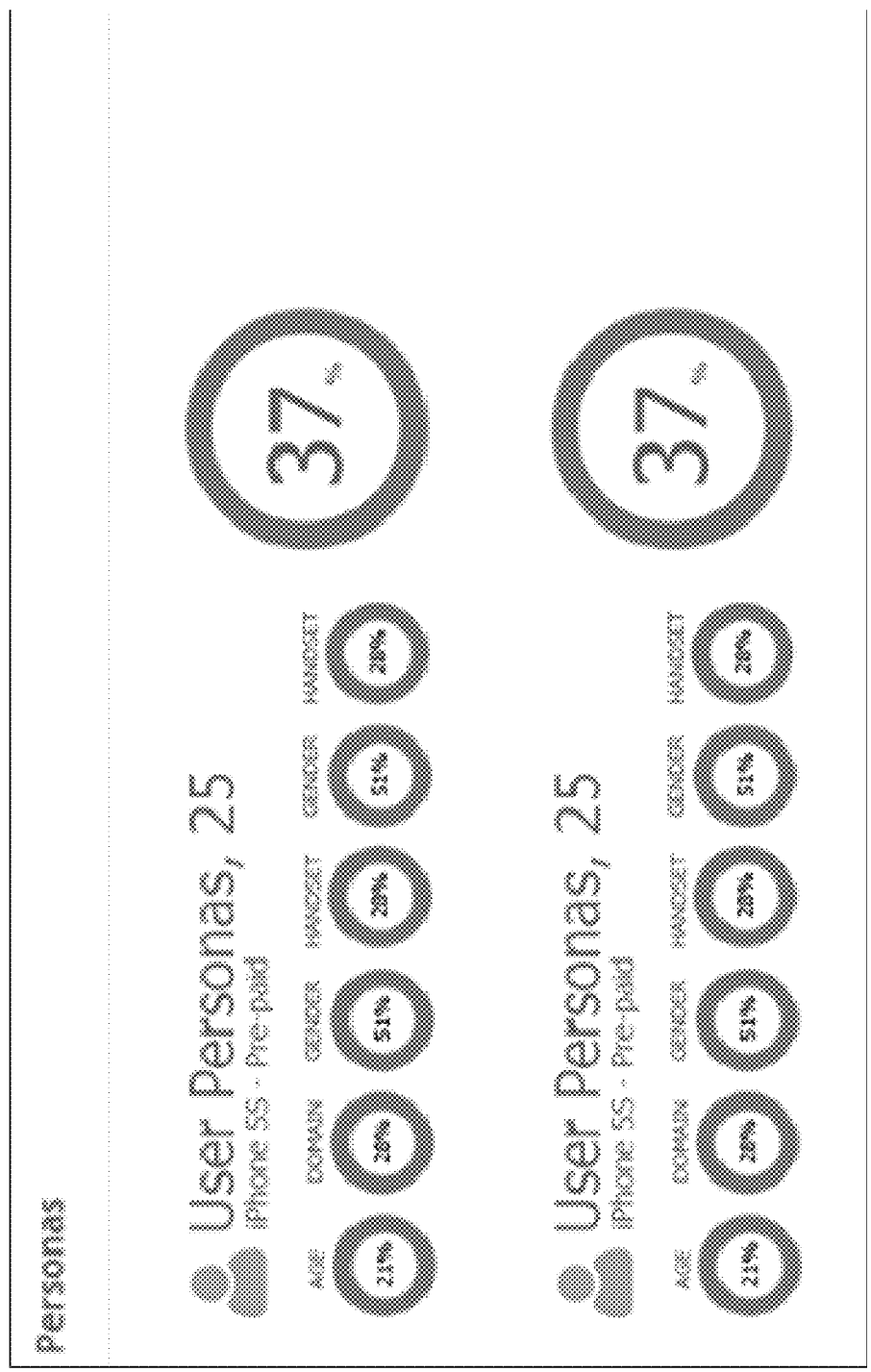
FIG. 13 illustrates aspects of a persona as may be developed in connection with the enhanced data collection, processing, and analysis techniques described herein.

Among other things a home location may be combined, associated, with any number of internal and/or external data sources (including inter alia demographic information, psychographic information, financial information, economic information, census information, marketing information, geographic information, (civil, criminal, etc.) public records, map information, geocoding information, etc.) to arrive at one or more user personas. See FIG. 13, which shows user personas that include information regarding user age, domain, gender, handset, mobile device type and mobile contract type (e.g., pre-paid). Such personas may be optionally refined, processed, reviewed, preserved, subsequently reported on or included in report/analytics/etc. processing, searched, etc.

As noted previously, various of the above activities may involve, leverage, incorporate, generate, etc. different subscriber particulars (such as inter alia gender, age, home location, shopping habits, work habits, preferences, etc.). Such particulars may result from among other things information that is received from external sources (such as for example an MNO), internal processing (augmentation, generation, etc.) activities, etc. For example, age and gender assessments may include possibly inter alia the concept of homophily (the tendency of individuals to associate and bond with similar others) and may employ any combination of one or more of inter alia rules, logic, workflow engines, decision trees, support vector machines, support vector networks, etc.

Various of the above may involve, leverage, incorporate, generate, etc. different indicators, values, such as for example postal codes (zip code, etc.), geographic indicators, etc.

Various of the above may involve or include the classification, characterization, etc. of aspects of content (as accessed, obtained, etc. by device users) as advertising with among other things different values (such as for example identifier, date, time, frequency, source, etc.) captured, developed, etc. for same.

Various of the above may incorporate one or more extensions, etc. such as sorting, ranking, ordering, banding, trend analysis, statistical analysis, etc.

It is important to note that the specific examples that were described above are illustrative only and it will be readily apparent to one of ordinary skill in the relevant art that numerous other examples are easily possible (such as motion mapping of subscriber movements, application ranking (e.g., ranking the sales or downloads of mobile software applications), browsing path analysis, segmentation mapping of consumer markets, etc.).

The SP repositories that were referenced above may comprise any combination of one or more of a RDBMS, an ODBMS, an in-memory DBMS, specialized facilities such as SAP HANA or Sybase IQ, a Java-based in-memory facility (e.g., one in which a repository is at least partially stored as a table in an off heap database), a data storage and management facility (such as inter alia Apache Hadoop), different storage paradigms (such as inter alia federation), etc.

As an example, a single 'logical' view of an SP repository might be offered with, behind the scenes, a tiered physical arrangement comprising (possibly inter alia):

1) A first (e.g., perhaps SAP HANA-based) facility within which the most recent (e.g., 30 days) of data may be stored.

2) A second (e.g., perhaps SAP IQ-based) facility within which less-recent (e.g., 31 day to 60 day old) data may be stored.

3) A third (e.g., perhaps Hadoop-based) facility within which older (e.g., 61 day to 2 year old) data may be stored.

with, among other things, supporting services such as aging, roll-off, migration, access, backup and recovery, security, etc.

As an additional example, a particular repository may house data from multiple DPs. Such a repository might include inter alia appropriate data segregation, partitioning, control, security, etc. mechanisms to for example ensure that a specific RC only has visibility, access, etc. to that portion of the data to which it is authorized, subscribed, etc.

Such repositories may support inter alia one or more (logical, physical, etc.) data models. See for example FIGS. 2 and 8. It is important to note that the particulars of those models (such as for example the specific data model and data model elements that are presented, the arrangements that are depicted, etc.) are illustrative only and it will be readily apparent to one of ordinary skill in the relevant art that numerous alternatives (including inter alia other or different data models and/or data model elements, alternative arrangements, etc.) are easily possible.

The various activities that were described above in reference to SPs, including the enumerated analysis activities 1 to 5, may be controlled, managed, driven, etc. by a suite of flexible, extensible, and dynamically configurable rules. Rules may exist for inter alia (local, regional, national, etc.) privacy requirements; each DP; each RC; scheduled processing activities; data enhancements; data aggregations; etc.

Different types, classes, etc. of RC users may be possible such as for example a regular user, a super user, an administrator, etc. Each user may have inter alia an associated set of access credentials (such as for example an identifier and a password), assigned permissions, defined access rights, etc. which may employ among other things any combination of one or more of Access Control Lists (ACLs), role-based paradigms, capability-based models, etc.

An SP may comprise an administrator that inter alia provides components, rules, etc. and performs management and administration through, as just one example, a web-based interface. It will be readily apparent to one of ordinary skill in the relevant art that numerous other interfaces (e.g., a data feed, an API, etc.), management frameworks (such as for example Tivoli), etc. are easily possible.

An SP may leverage, incorporate, etc. the capabilities, features, functions, technologies, etc. of one or more external entities and/or one or more internal and/or external data sources (of for example demographic information, psychographic information, financial information, economic information, census information, marketing information, geographic information, (civil, criminal, etc.) public records, map information, Point of Sale (POS) data, social media facilities, etc.).

Results Consumer

An RC is an entity that supports the consumption of data through inter alia reporting, display, analysis, etc. activities. For example, an RC user might be trying to answer questions such as:

1) A big box retailer may need to understand the seasonality of travel proximate to their store and the surrounding area and how that contrasts against their competitors.

2) How many 25 year old females enhance their shopping experience at lunchtime?

2) How many new mobile devices have been activated this month?

3) What are the top 100 mobile applications?

4) What mechanisms (such as for example browser, application, etc.) did device users employ to access, obtain, etc. content (e.g., web pages, etc.)?

5) Did a recent mobile media campaign deliver its expected return on investment?

6) A high end retailer may want to understand the CAMEO demographics of general footfall traffic in potential areas for expansion (said areas being defined by the retailer through for example custom polygons) with an area's characteristics (such as wealth or income) contributing to the retailer's site selection decision.

7) A retailer may want to understand the flow of people between their stores and their competitors' stores. For example, if potential customers first visit a competitor store before they visit their store they may wish to identify actionably programs to counter such behavior.

8) An insurance company may want to offer usage based insurance. In connection with such an offering, they may want to understand the particulars (location, loss profile, etc.) of different areas to inter alia associate characteristics (such as for example risk level) to an area.

9) An auto insurance company may want to offer usage based insurance. In connection with such an offering, they may want to understand the details (day of week, time of day, distance, duration, route(s) taken, etc.) related to different travel activities including inter alia commute (between for example a home location and a work location).

It is important to note that the questions listed above are illustrative only and it will be readily apparent to one of ordinary skill in the relevant art that numerous other, different, etc. questions are easily possible.

An RC may employ various applications including for example any combination of one or more of inter alia web-based applications (incorporating for example HTML5, Cascading Style Sheets (CSS), JavaScript, etc.), hybrid applications (incorporating for example containerization, etc.), native applications, Rich Internet Applications (RIAs), Rich User Applications (RUAs), etc. As well, an RC may employ, leverage, etc. aspects of an API to access, receive, retrieve, etc. information from inter alia an SP.

Figure 6:
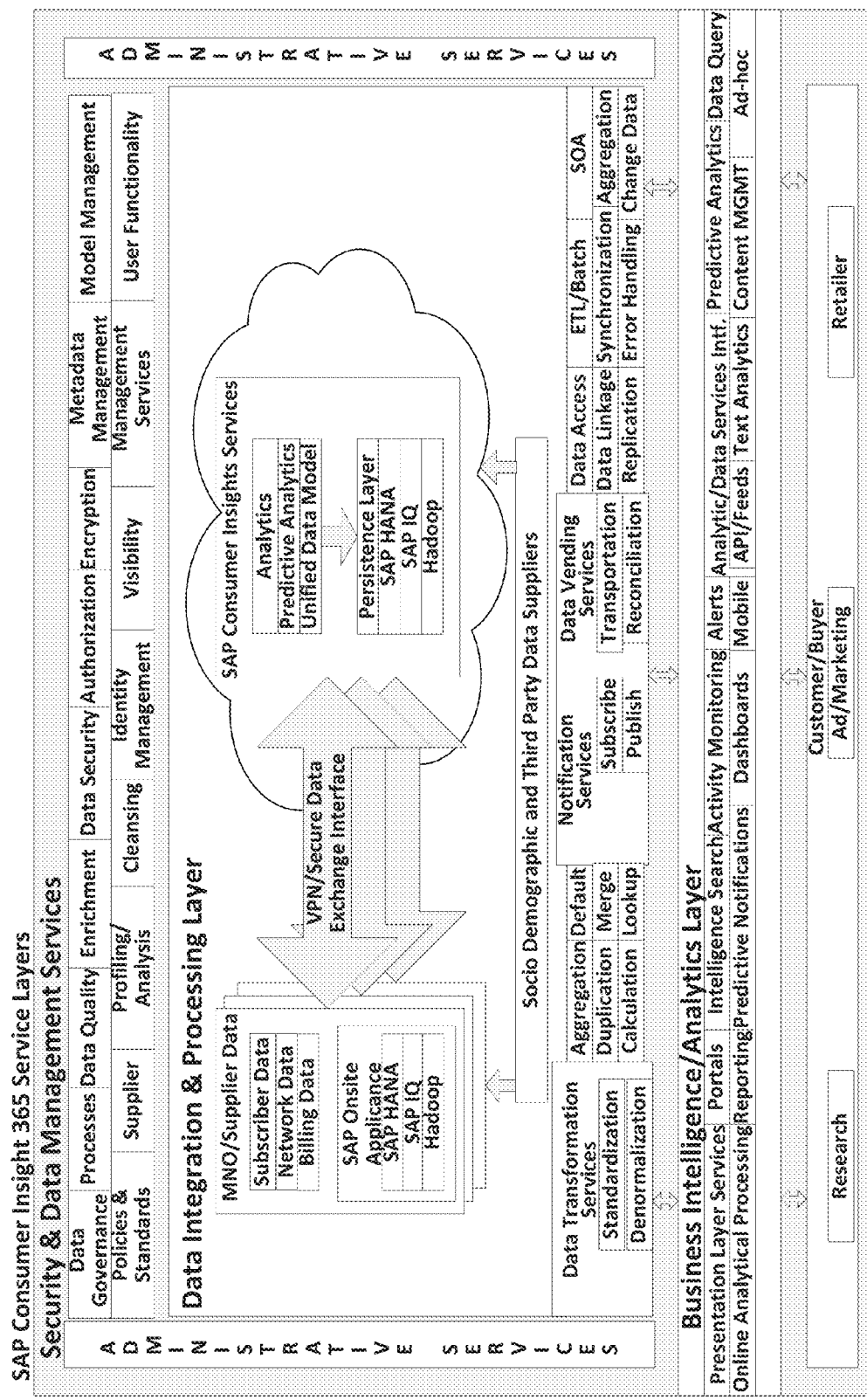
FIG. 6 illustrates an architectural overview of one possible implementation of the data collection, processing, and analysis described herein, including functionality exposed to a Results Consumer (RC).
Figure 7A:
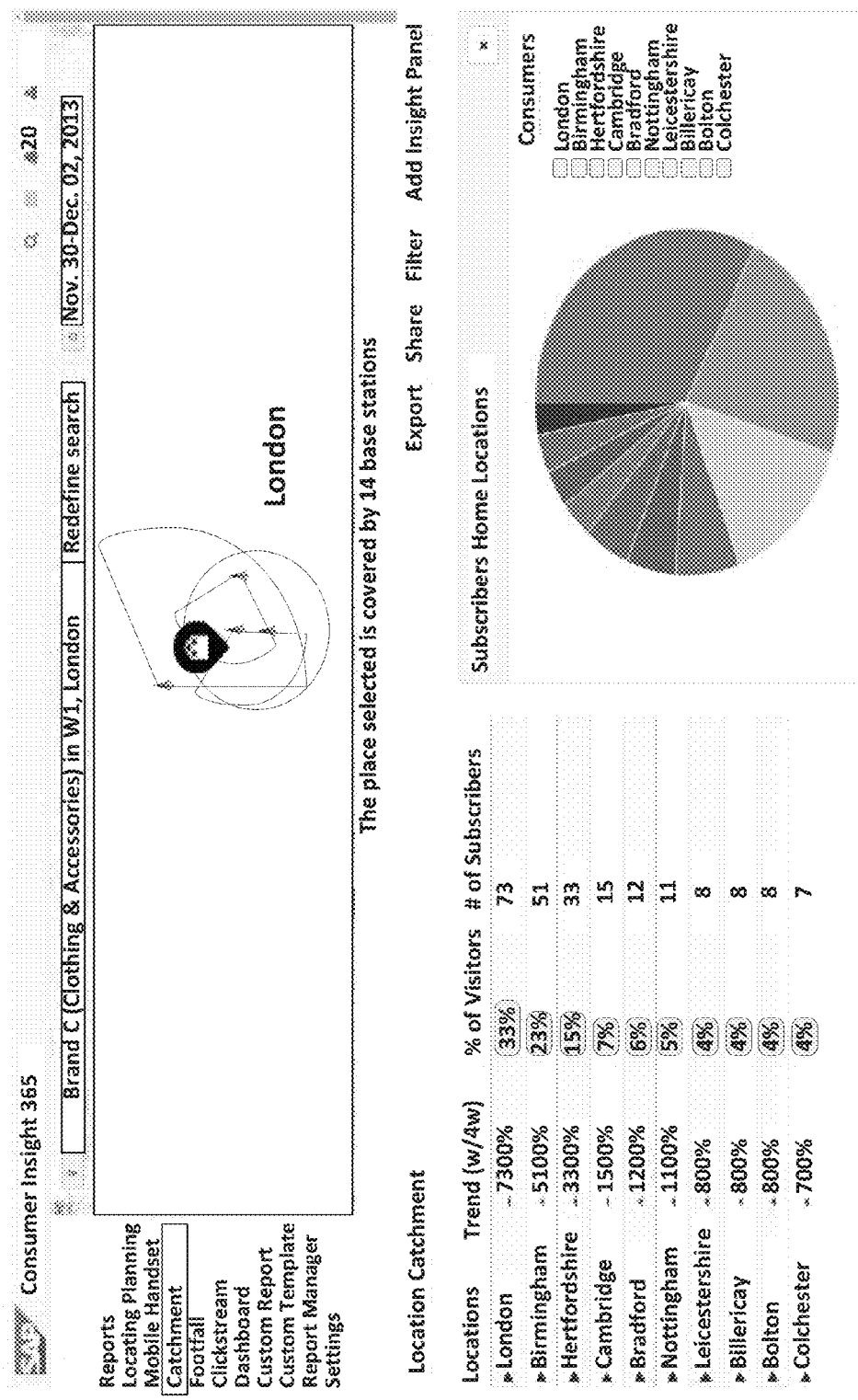
FIGS. 7a-7e illustrate example user interface screens that may be associated with the enhanced data collection, processing, and analysis techniques described herein.
Figure 7B:
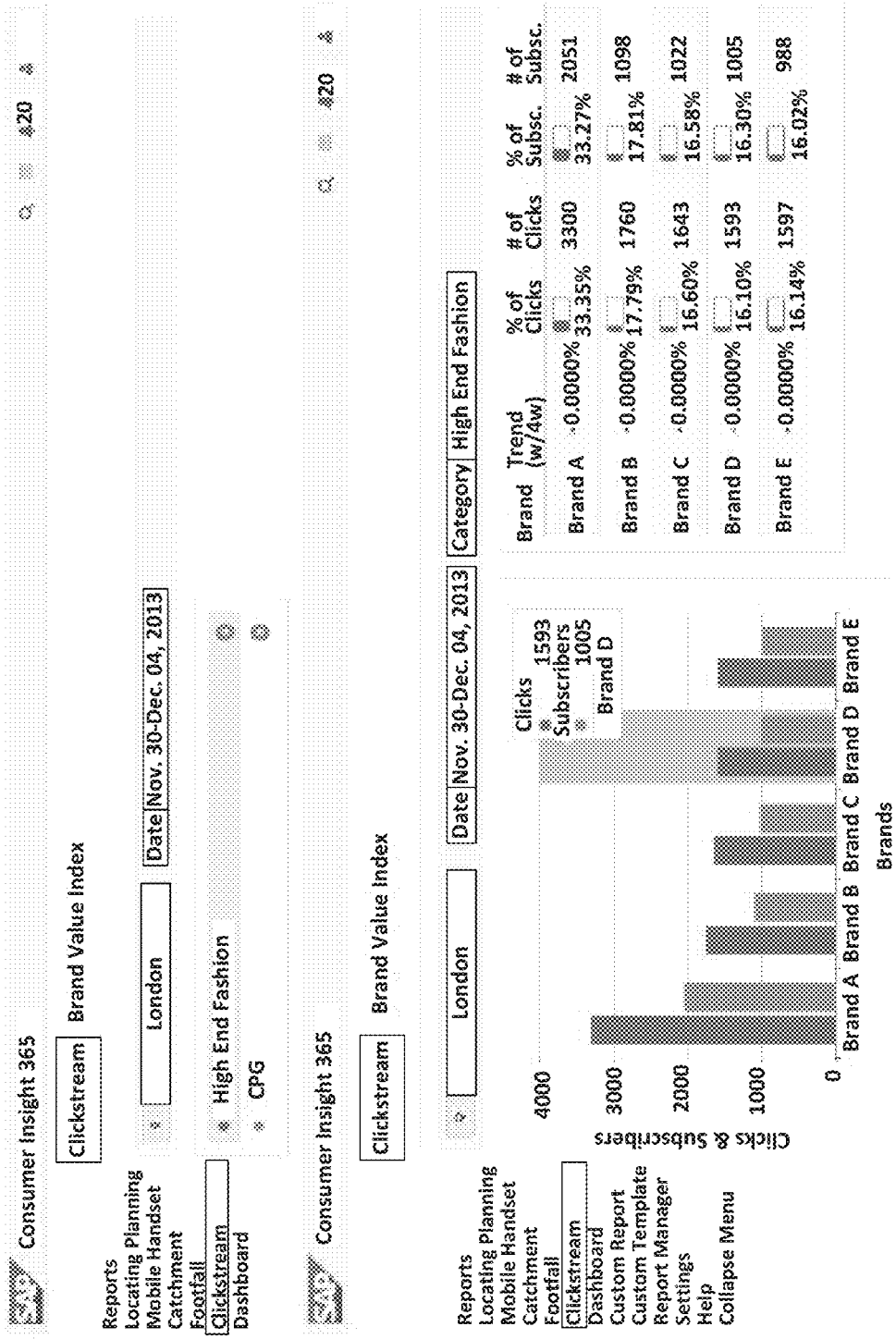
Figure 7C:
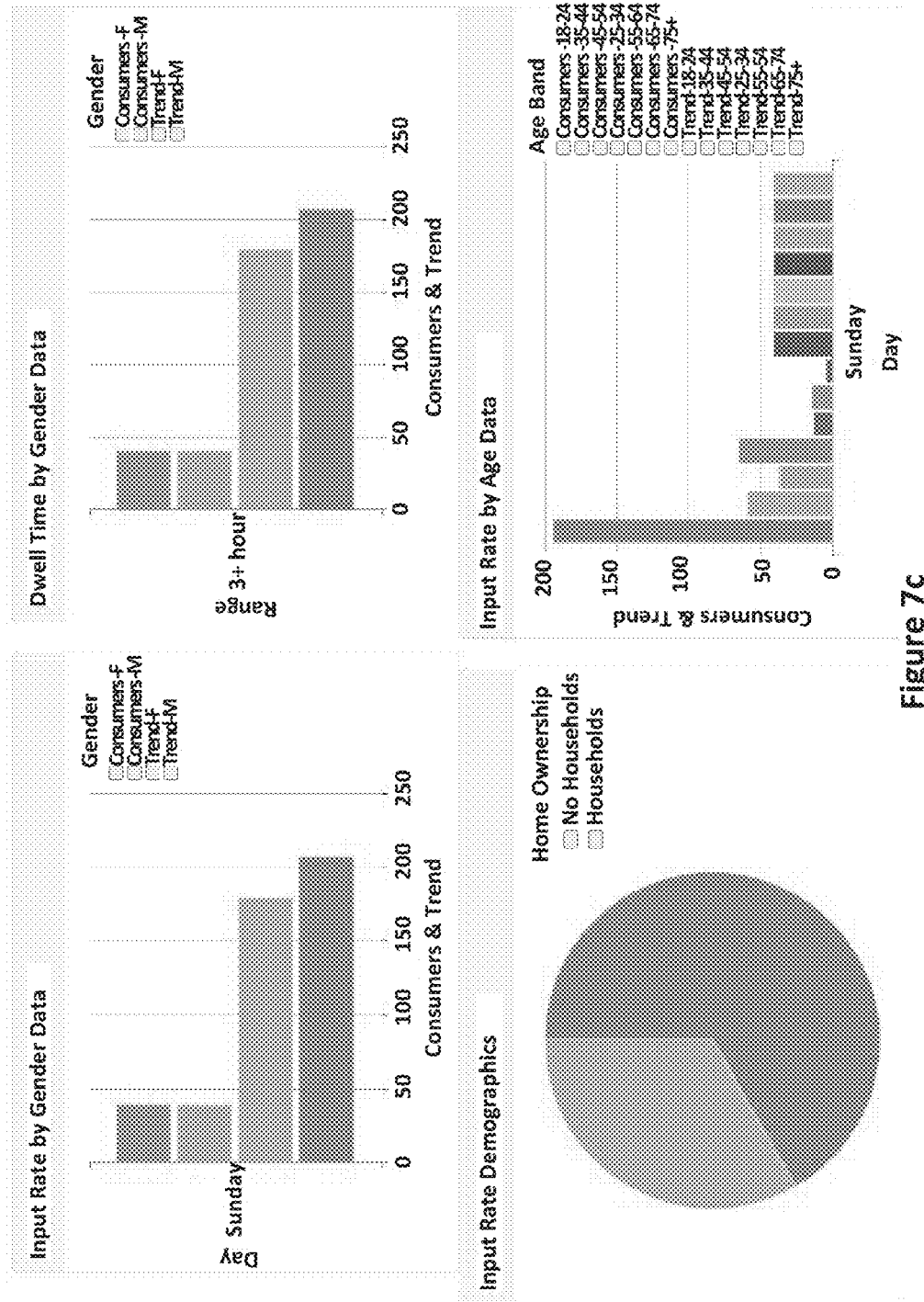
Figure 7D:
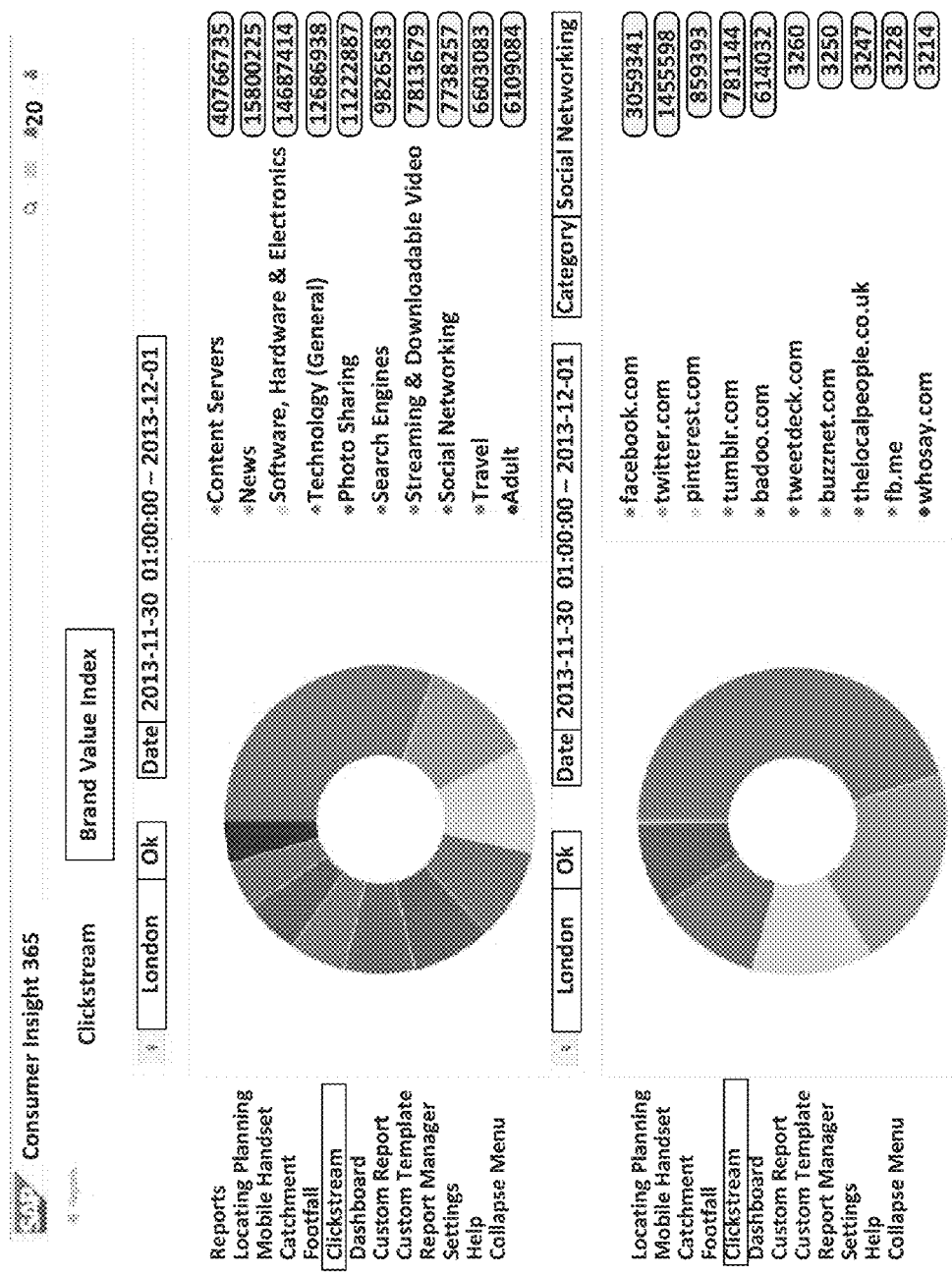
Figure 7E:
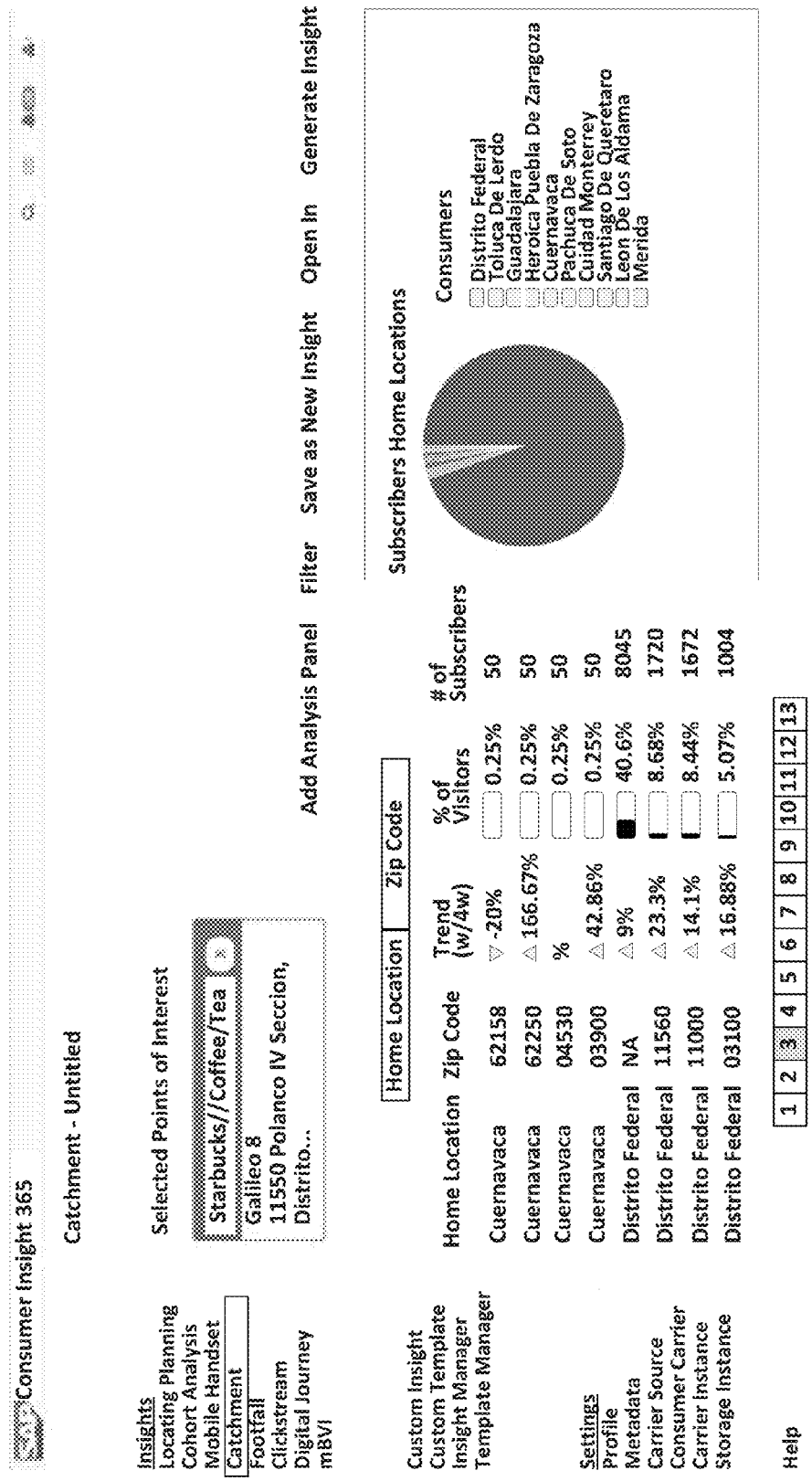

FIG. 6 depicts, among other things, some of the functionality that may be exposed to an RC. The functionality in FIG. 6 includes security and data management services and administrative services. Examples, of security and data management services include data cleansing, encryption and other data security functions. Examples of administrative services include integration and collection of MNO, subscriber, network or billing data, and data analytics, e.g., predictive analytics performed on data stored using a unified data model to output alerts or reports to the RC user.

An RC may comprise any number of physical devices such as for example any combination of one or more of inter alia a wired device, a wireless device, a mobile phone, a feature phone (i.e., a low end phone with limited capabilities in comparison to a smartphone), a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), cable system or other set-top-box, an entertainment system component such as a television set, etc.

An RC user may have inter alia an associated set of access credentials (such as for example an identifier and a password), assigned permissions, defined access rights, defined data visibility scope, etc.

An interaction between an RC and an SP may employ any combination of one or more mechanisms including possibly inter alia a (JavaScript Object Notation (JSON), Representational State Transfer (REST), etc.) API, an EDI facility, (open, secure, etc.) FTP, one or more proprietary or standards-based application-level and/or transport-level protocols, a publish-subscribe paradigm, a push-pull model, file exchanges, a (courier, overnight, etc.) delivery service, postal mail, etc. and may utilize among other things XML documents, CSV files, name-value pairs, etc.

Such mechanisms may comprise one or more servers, gateways, interfaces, etc. and may leverage inter alia any combination of a dedicated communication circuit, the open Internet, a VPN, etc. and may include various security mechanisms (such as access credentials, etc.).

Interactions between an RC and an SP may comprise various messages, including inter alia any combination of one or more of a request message, a response message, a status or inquiry message, a confirmation message, etc. Such messages may be generated on a scheduled basis, on an ad hoc (e.g., as needed) basis, etc.

Such interactions may employ any combination of one or more mechanisms including inter alia a (SMS, MMS, IMS, etc.) message exchange, a WAP exchange, a structured or an unstructured data transfer, a data transfer operation atop one or more proprietary or standards-based protocols, an E-Mail exchange, an Instant Messaging (IM) exchange, a voice telephone call, Wi-Fi, NFC, etc.

Aspects of CI may contain, offer, etc. a registration process during which inter alia information may be collected, processed, analyzed, augmented, preserved, etc. For example, in connection with an RC user such a registration process may involve:

A) Identifying Information. For example, possibly among other things, name, address, landline and wireless Telephone Numbers (TNs), E-Mail addresses, IM names/identifiers, a unique identifier and a password, etc.

B) Preference Information. For example, information on, possibly inter alia, geographies of interest, reporting needs, etc.

C) Billing Information. Different optional billing models may be offered including, inter alia, a fixed one-time charge, a recurring (monthly, etc.) fixed charge, a recurring (monthly, etc.) variable charge, etc. Different payment mechanisms may be supported including, possibly among other things, credit or debit card information, authorization to place a charge on a user's phone bill, etc.

D) Other Information. Additional, possibly optional, information.

During a registration process—collected information may be reviewed, confirmed, etc. through one or more manual and/or automatic mechanisms; aspects of the process may be completed through any combination of one or more channels including, inter alia, the World Wide Web (via, for example, a website that is operated by an SP), wireless messaging (SMS, MMS, IMS, etc.), E-Mail messages, IM, conventional mail, telephone, Interactive Voice Response (IVR) facility, etc.; collected information may be augmented to include, as just a few examples of the many possibilities, internal and/or external demographic, psychographic, sociological, etc. data; etc.

Referring again to FIG. 1, for a particular DP, PEs and RCs may reside in the DP, may reside in an SP, may reside in both the DP and an SP (e.g., in a distributed fashion) and may comprise inter alia any combination of one or more of local or on-premise resources, cloud-based resources, etc.

A PE may among other things leverage hardware (such as for example platform clustering paradigms, network traffic routing and switching mechanisms, etc.) and/or software (such as for example Operating Systems (OSs), file systems, etc.) that provide support for inter alia data intensive operations (e.g., big data, fast data, etc.).

Various of the request, response, confirmation, etc. interactions that were described above may optionally contain any combination of one or more of information elements (such as for example a relevant or applicable factoid, a piece of product information, etc.), advertisements, promotional items, coupons, vouchers, surveys, questionnaires, gift cards, retailer credits, etc. Such material may be selected statically or randomly (from for example a repository of defined material), may be location-based (for example, selected from a pool of available material based on possibly inter alia information about the current physical location of a user's device), may be product-specific, etc.

For convenience and ease of exposition a single SP is depicted in FIG. 1. Other arrangements are easily possible including for example two, three, or more SP entities (such as inter alia retailers, service bureaus, intermediaries, aggregators, software firms, etc.) performing various combinations of the SP activities that were described above and employing inter alia various traffic management (distribution, routing, etc.) capabilities in support of for example performance, disaster recovery, etc.

Various of the information that is conveyed to an RC may among other things be adapted to meet specific localization needs such as language, date and time format, etc. Such adaptations may be driven by among other things a user's preferences, information about the current physical location of a user, etc. and may leverage previously-prepared pools of material (such as for example a U.S.-specific pool of material, a U.K.-specific pool of material, a French-specific pool of material, etc.) and/or dynamically generate any localization-specific material that may become needed.

Among other things an SP may offer various reporting mechanisms including among other things scheduled (e.g., hourly, daily, weekly, etc.) reporting, on-demand reporting, scheduled (e.g., hourly, daily, weekly, etc.) data mining operations, and/or on-demand data mining operations with results delivered through any combination of one or more of (SMS, MMS, IMS, etc.) messaging, a web-based facility, E-Mail, data transfer operations, a Geographic Information System (GIS) or other visualization facility, etc. Such reporting mechanisms may draw from repositories within an SP and/or any number of data sources external to an SP.

The interactions that were described above may employ among other things various addressing artifacts such as inter alia telephone numbers, short codes, IP addresses, E-Mail address, IM handles, Session Initiation Protocol (SIP) addresses, URIs/URLs, etc.

Various of the interactions that were described above may optionally leverage, reference, etc. information on the current physical location of a user's device as obtained through inter alia a one or more of a Location-Based Service (LBS) facility, a Global Positioning System (GPS) facility, etc. to among other things enhance security, provide more applicable or appropriate information, etc.

The rules that were described above (e.g., in connection with a DP and/or an SP) may be created, crafted, edited, managed, etc. by a system administrator, by a user, by an application developer, etc. using among other things a Graphical User Interface (GUI) facility (that may offer among other things a What You See Is What You Get (WYSIWYG) capability), APIs, computer code libraries, etc.

Various of the interactions, activities, etc. that were described above may result in for example one or more billing, financial, etc. transactions.

Any number of revenue share plans may be supported with as just one example an SP acting as an plan administrator for all of the different entities residing upstream and/or downstream of the Service Provider and completing inter alia various billing, fund collection, fund distribution, etc. operations.

Various of the interactions that were described above comprise, leverage, employ, etc. any combination of one or more of inter alia a (SMS, MMS, IMS, etc.) message exchange, a WAP exchange, a structured or an unstructured data transfer, a data transfer operation atop one or more standards-based protocols (such as for example Transmission Control Protocol (TCP)/IP) and/or proprietary protocols, an E-Mail exchange, an IM exchange, Wi-Fi, a NFC exchange, etc.

The various interactions that were described above are illustrative only and it will be readily apparent to one of ordinary skill in the relevant art that numerous other interactions are easily possible. For example, and inter alia, any combination of a depicted interaction may be repeated any number of times.

The user registration process that was described above may take place through any combination of one or more channels (including inter alia a web-based interface, postal mail, telephone, etc.), may be tailored (e.g., with respect to the range of information gathered, the scope of access/privileges/etc. subsequently granted, etc.) to the class of user. For example, different types, categories, etc. of users may complete different registration processes; may gather a range of identifying, preference, billing, etc. information; and may preserve, store, etc. aspects of the gathered information in one or more repositories (e.g., databases) optionally organized as a user profile. Among other things a service provider may optionally augment a user profile with inter alia internal and/or external demographic, psychographic, sociological, financial, etc. data.

FIGS. 7a-7e illustrate example user interface screens consistent with embodiments described herein. More specifically, an SP may make available to an RC through any one of several possible channels, including private and public network connections, any one or more of the following user interface screens that enable an RC user to learn about, explore, visualize, etc. aspects of the data and processing results that were described above (such as inter alia the predictions, assessments, rankings, aggregations, etc. that an SP developed during various of its processing activities).

Such user interfaces may employ one or more start or landing pages and may optionally comprise inter alia login in, help, lookup, etc. facilities.

Such user interfaces may employ any combination of one or more contexts including inter alia spatial, non-spatial, temporal, etc. to support among other things the ability to report on, analyze, etc. things such as brand activity and trends, device activity and trends, mobile application activity and trends, etc.

Such user interfaces may support a range of capabilities such as inter alia ranking, ordering, etc. (e.g., top 10, top 20, top n, most relevant, least relevant, etc.); location selection/refinement/etc. (e.g., an AOI, a POI, a street, a neighborhood, a town or city, a custom/arbitrary/etc. geographic region, a zip code, etc.); time period selection/refinement/etc.; traveling (walking, bicycling, driving, etc.) time and distance mechanisms; various topographic regions (e.g., square, rectangle, circle, triangle, polygon, irregular shape, etc.); etc.

Such user interfaces may support one or more Insight Panels where a user may inter alia add, define, identify, etc. things like disclaimers, definitions, constraints, advertisements, etc. and to which a user may add any combination of one or more tables, charts, graphs, etc.

Such user interfaces may offer an RC user a range of predefined artifacts such as reports, templates, search criteria, preferences, profiles, etc. Additionally, such user interfaces may allow an RC user to for example and inter alia define, save, retrieve, modify, etc. various custom artifacts such as reports, templates, search criteria (e.g., time periods such as 'Summer Season,' location(s), etc.), preferences, profiles, etc.

Such user interfaces may offer one or more mechanisms to highlight, annotate, overlay, etc. artifacts such as for example DP infrastructure elements. For example, for a DP cell tower, antenna, etc. information on coverage area geometry (circle, wedge, etc.), signal strength, etc. may be included.

Such user interfaces may offer various drill-down features, capabilities, etc. through which for example a user may explore, retrieve additional information on, etc. different pieces of data.

An RC user's interactions with a user interface may result in among other things an SP completing a range of processing activities including among other things the examination, parsing, augmentation, manipulation, replacement, checking, editing, validation, mapping, aggregation, enhancement, etc. of one or more elements of data received from a DP with the optional preservation of aspects of the results, outcome, etc. of various of the activities in for example one or more repositories.

Such user interfaces may comprise any combination of one or more textual elements, graphic elements, etc. including inter alia descriptive text, charts, graphs, tables, (tree, thematic, choropleth, heat, etc.) maps, icons, labels, links or references, etc. and may be offered through any combination of one or more of inter alia web-based applications (incorporating for example HTML5, CSS, JavaScript, etc.), hybrid applications (incorporating for example containerization, etc.), native applications, RIAs, RUAs, etc.

Aspects of the above can be implemented through any combination of one or more of software, firmware, and/or hardware.

Figure 9:
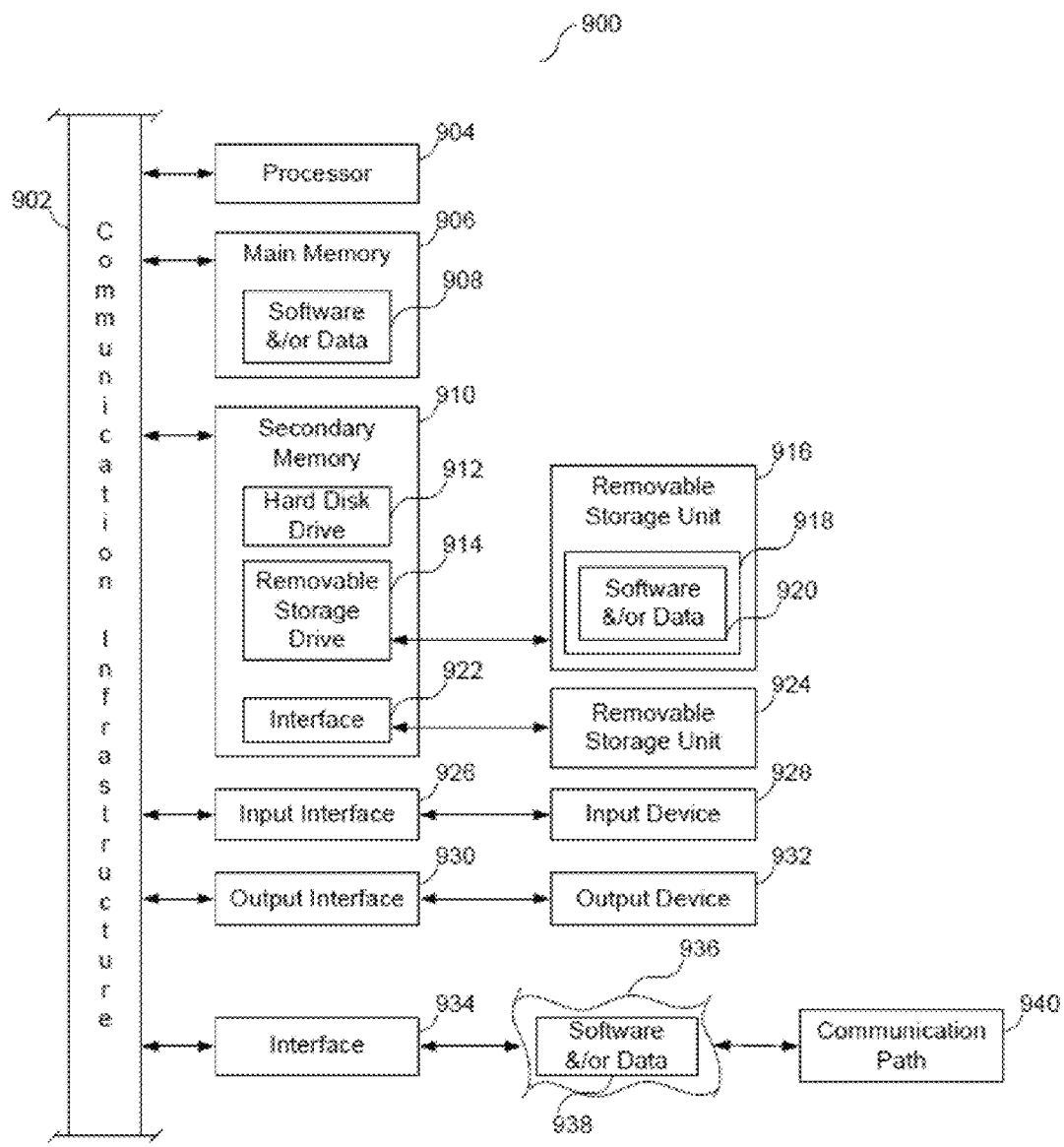
FIG. 9 illustrates an example computer and telecommunications hardware and software infrastructure capable of implementing the enhanced data collection, processing, and analysis techniques described herein.

FIG. 9 illustrates an example computer system 900 in which the above, or portions thereof, may be implemented as computer-readable code. Various embodiments of the above are described in terms of this example computer system 900. After reading this description, it will become apparent to a person skilled in the relevant art how to implement the embodiments described herein using other computer systems and/or computer architectures.

Computer system 900 includes one or more processors, such as processor 904. Processor 904 can be a special purpose processor or a general purpose processor. Processor 904 is connected to a communication infrastructure 902 (for example, a bus or a network).

Computer system 900 also includes a main memory 906, preferably Random Access Memory (RAM), containing possibly inter alia computer software and/or data 908.

Computer system 900 may also include a secondary memory 910. Secondary memory 910 may include, for example, a hard disk drive 912, a removable storage drive 914, a memory stick, etc. A removable storage drive 914 may comprise a floppy disk drive, a magnetic tape drive, an optical disk drive, a flash memory, or the like. A removable storage drive 914 reads from and/or writes to a removable storage unit 916 in a well-known manner. A removable storage unit 916 may comprise a floppy disk, magnetic tape, optical disk, etc. which is read by and written to by removable storage drive 914. As will be appreciated by persons skilled in the relevant art(s) removable storage unit 916 includes a computer usable storage medium 918 having stored therein possibly inter alia computer software and/or data 920.

In alternative implementations, secondary memory 910 may include other similar means for allowing computer programs or other instructions to be loaded into computer system 1400. Such means may include, for example, a removable storage unit 924 and an interface 922. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 924 and interfaces 922 which allow software and data to be transferred from the removable storage unit 924 to computer system 900.

Computer system 900 may also include an input interface 926 and a range of input devices 928 such as, possibly inter alia, a keyboard, a mouse, etc.

Computer system 900 may also include an output interface 930 and a range of output devices 932 such as, possibly inter alia, a display, one or more speakers, etc.

Computer system 900 may also include a communications interface 934. Communications interface 934 allows software and/or data 938 to be transferred between computer system 900 and external devices. Communications interface 934 may include a modem, a network interface (such as an Ethernet card), a communications port, a Personal Computer Memory Card International Association (PCMCIA) slot and card, or the like. Software and/or data 938 transferred via communications interface 934 are in the form of signals 936 which may be electronic, electromagnetic, optical, or other signals capable of being received by communications interface 934. These signals 936 are provided to communications interface 934 via a communications path 940. Communications path 940 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 916, removable storage unit 924, and a hard disk installed in hard disk drive 912. Signals carried over communications path 940 can also embody the logic described herein. Computer program medium and computer usable medium can also refer to memories, such as main memory 906 and secondary memory 910, which can be memory semiconductors (e.g. Dynamic Random Access Memory (DRAM) elements, etc.). These computer program products are means for providing software to computer system 900.

Computer programs (also called computer control logic) are stored in main memory 906 and/or secondary memory 910. Computer programs may also be received via communications interface 934. Such computer programs, when executed, enable computer system 900 to implement aspects of the disclosure as discussed herein. In particular, the computer programs, when executed, enable processor 904 to implement the processes of aspects of the above. Accordingly, such computer programs represent controllers of the computer system 900. Where aspects of the instant disclosure are implemented using software, the software may be stored in a computer program product and loaded into computer system 900 using removable storage drive 914, interface 922, hard drive 912 or communications interface 934.

The instant disclosure is also directed to computer program products comprising software stored on any computer useable medium. Such software, when executed in one or more data processing devices, causes data processing device(s) to operate as described herein. Embodiments of the instant disclosure employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

Based on the teachings contained in this disclosure, it will be apparent to persons skilled in the relevant art(s) how to make and use aspects of the instant disclosure using data processing devices, computer systems, and/or computer architectures other than that shown in FIG. 9. In particular, embodiments may operate with software, hardware, and/or operating system implementations other than those described herein.

For simplicity of exposition the above discussion focused principally on telecommunications generally and mobile operators specifically. It will be readily apparent to one of ordinary skill in the relevant art that numerous other contexts are easily possible including inter alia transportation environments, IoT/M2M environments, (customer, etc.) support operations, public health management activities, public safety management activities, event management, financial environments, etc.

The above description is intended by way of example only. It will be readily apparent to one of ordinary skill in the relevant art that various modifications and structural changes may be made therein without departing from the scope of the concepts described herein and within the scope and range of equivalents of the claims.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

What is claimed is:

1. A method for implementation by one or more data processors forming one or more computing devices, the method comprising:
   collecting, by at least one data processor, raw data from a plurality of wireless devices, wherein the raw data includes activity recorded when the wireless devices are at a selected topographic region, and wherein the raw data is combined to produce aggregated data representative of the activities of the individual wireless devices;
   forming, by at least one data processor, a geometric representation of the selected topographic region;
   adjusting, by at least one data processor, a size of the geometric representation based on a degree of confidence in coordinates of the selected topographic region;
   selecting, by at least one data processor, either the aggregated data or the raw data for analysis depending on whether the raw data meets a threshold activity or subscriber density level; and
   analyzing, by at least one data processor, the selected data to identify activity patterns of users of the wireless devices, wherein the analyzing:
      takes the degree of confidence into consideration when the aggregated data is selected,
      does not take the degree of confidence into consideration when the raw data is selected, and
      includes determining, by at least one data processor, a home location of an individual wireless device by analyzing times and locations of calls made by the individual wireless device over a period of time, wherein the home location is determined by (i) analyzing, by at least one data processor, call volumes and identifying cell towers that are associated with the calls and that had the highest call volume during the period of time and (ii) by identifying, by at least one data processor, intersections of the cell towers.

2. The method of claim 1, wherein the aggregated data are selected when the raw data meets the threshold activity or subscriber density level.

3. The method of claim 1, wherein the raw data are selected when the raw data fails to meet the threshold activity or subscriber density level.

4. The method of claim 1, further comprising:
   selecting, by at least one data processor, a location of a cell tower or intersection having a highest percentage of call volume coverage as the home location.

5. The method of claim 1, wherein the home location is determined by identifying, by at least one data processor, cell towers that are associated with the calls and that have the shortest distance from each other.

6. A non-transitory computer programmable product comprising a computer-readable storage medium having computer-readable program instructions, which when executed result in operations comprising:
   collect raw data from a plurality of wireless devices, wherein the raw data includes activity recorded when the wireless devices are at a selected topographic region, and wherein the raw data is combined to produce aggregated data representative of the activities of the individual wireless devices;
   form a geometric representation of the selected topographic region;
   adjust a size of the geometric representation based on a degree of confidence in coordinates of the selected topographic region;
   select either the aggregated data or the raw data for analysis depending on whether the raw data meets a threshold activity or subscriber density level; and
   analyze the selected data to identify activity patterns of users of the wireless devices, wherein the analyzing:
      takes the degree of confidence into consideration when the aggregated data is selected,
      does not take the degree of confidence into consideration when the raw data is selected, and
      includes determining, by at least one data processor, a home location of an individual wireless device by analyzing times and locations of calls made by the individual wireless device over a period of time, wherein the home location is determined by (i) analyzing, by at least one data processor, call volumes and identifying cell towers that are associated with the calls and that had the highest call volume during the period of time and (ii) by identifying, by at least one data processor, intersections of the cell towers.

7. The non-transitory computer programmable product of claim 6, wherein the aggregated data are selected when the raw data meets the threshold activity or subscriber density level.

8. The non-transitory computer programmable product of claim 6, wherein the raw data are selected when the raw data fails to meet the threshold activity or subscriber density level.

9. The non-transitory computer programmable product of claim 6, wherein the computer device is configured to:
   select a location of a cell tower or intersection having a highest percentage of call volume coverage as the home location.

10. The non-transitory computer programmable product of claim 6, wherein the home location is determined by identifying cell towers that are associated with the calls and that have the shortest distance from each other.

11. A system comprising:
   at least one data processor;
   memory storing instructions, which when executed by the at least one data processor result in operations comprising:
      collecting, by at least one data processor, raw data from a plurality of wireless devices, wherein the raw data includes activity recorded when the wireless devices are at a selected topographic region, and wherein the raw data is combined to produce aggregated data representative of the activities of the individual wireless devices;

forming, by at least one data processor, a geometric representation of the selected topographic region;

adjusting, by at least one data processor, a size of the geometric representation based on a degree of confidence in coordinates of the selected topographic region;

selecting, by at least one data processor, either the aggregated data or the raw data for analysis depending on whether the raw data meets a threshold activity or subscriber density level;

analyzing, by at least one data processor, the selected data to identify activity patterns of users of the wireless devices, wherein the analyzing:

takes the degree of confidence into consideration when the aggregated data is selected, does not take the degree of confidence into consideration when the raw data is selected, and includes determining, by at least one data processor, a home location of an individual wireless device by analyzing times and locations of calls made by the individual wireless device over a period of time, wherein the home location is determined by (i) analyzing, by at least one data processor, call volumes and identifying cell towers that are associated with the calls and that had the highest call volume during the period of time and (ii) by identifying, by at least one data processor, intersections of the cell towers, selecting, by at least one data processor, a location of a cell tower or intersection having a highest percentage of call volume coverage as the home location.

12. The system of claim 11, wherein the aggregated data are selected when the raw data meets the threshold activity or subscriber density level.

13. The system of claim 11, wherein the raw data are selected when the raw data fails to meet the threshold activity or subscriber density level.

14. The system of claim 11, wherein the home location is determined by identifying, by at least one data processor, cell towers that are associated with the calls and that have the shortest distance from each other.

* * * * *